(12) United States Patent
Morales et al.

(10) Patent No.: US 7,624,080 B1
(45) Date of Patent: Nov. 24, 2009

(54) SMART SENSOR CONTINUOUSLY ADAPTING TO A DATA STREAM IN REAL TIME USING BOTH PERMANENT AND TEMPORARY KNOWLEDGE BASES TO RECOGNIZE SENSOR MEASUREMENTS

(75) Inventors: Miguel A. Morales, Leesburg, VA (US); David J. Haas, North Potomac, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 210 days.

(21) Appl. No.: 11/362,595

(22) Filed: Feb. 25, 2006

Related U.S. Application Data

(60) Provisional application No. 60/656,511, filed on Feb. 25, 2005.

(51) Int. Cl.
G06F 17/00 (2006.01)
G06F 3/08 (2006.01)
G06N 5/00 (2006.01)

(52) U.S. Cl. .............................. 706/20; 706/22; 706/25; 706/61

(58) Field of Classification Search .................. 706/20, 706/22, 25, 61
See application file for complete search history.

(56) References Cited

U.S. PATENT DOCUMENTS

| | | |
|---|---|---|
| 4,586,403 A | 5/1986 | Lee et al. |
| 5,005,142 A | 4/1991 | Lipchak et al. |
| 5,056,360 A | 10/1991 | Dosdall et al. |
| 5,158,062 A | 10/1992 | Chen |
| 5,392,599 A | 2/1995 | Hamburg et al. |
| 5,469,369 A | 11/1995 | Rose-Pehrsson et al. |
| 5,627,465 A | 5/1997 | Alfors et al. |
| 5,748,847 A | 5/1998 | Lo |
| 5,751,609 A | 5/1998 | Schaefer, Jr. et al. |

(Continued)

FOREIGN PATENT DOCUMENTS

JP 01010307 A * 1/1989

OTHER PUBLICATIONS

Schecke et al., "A Knowledge-Based Approachto Intelligent Alarms in Anesthesia", 1991.*

(Continued)

*Primary Examiner*—David R Vincent
*Assistant Examiner*—Nathan H Brown, Jr
(74) *Attorney, Agent, or Firm*—Howard Kaiser

(57) ABSTRACT

As the present invention's adaptation process is typically practiced, an observation made by one or more sensing element(s) is classified as being either recognized or unrecognized in the context of a knowledge base. If the observation is classified as being recognized and consistent, then the observation is assimilated into the knowledge base; otherwise, it is not assimilated. If the observation is classified as being unrecognized, then the observation is classified as being uncorroborated in the context of the knowledge base. Prior to being classified as being uncorroborated, the unrecognized observation is categorized in the context of the knowledge base and is associated with an outcome in terms of relationship between/among physical parameters. At the time that corroboration is determined, the observation (originally unrecognized) and its categorization-related and association-related information are assimilated into the knowledge base.

14 Claims, 10 Drawing Sheets

U.S. PATENT DOCUMENTS

| | | | |
|---|---|---|---|
| 5,819,007 A * | 10/1998 | Elghazzawi | 706/46 |
| 5,857,160 A | 1/1999 | Dickinson et al. | |
| 5,875,108 A | 2/1999 | Hoffberg et al. | |
| 5,890,101 A | 3/1999 | Schaefer, Jr. et al. | |
| 5,901,246 A | 5/1999 | Hoffberg et al. | |
| 5,901,272 A | 5/1999 | Schaefer, Jr. et al. | |
| 5,948,030 A | 9/1999 | Miller et al. | |
| 5,978,025 A | 11/1999 | Tomasini et al. | |
| 5,987,397 A | 11/1999 | McCool et al. | |
| 6,039,144 A | 3/2000 | Chandy et al. | |
| 6,081,750 A | 6/2000 | Hoffberg et al. | |
| 6,088,661 A | 7/2000 | Poublon | |
| 6,263,325 B1 | 7/2001 | Yoshida et al. | |
| 6,314,329 B1 | 11/2001 | Madau et al. | |
| 6,400,996 B1 | 6/2002 | Hoffberg et al. | |
| 6,418,424 B1 | 7/2002 | Hoffberg et al. | |
| 6,437,936 B1 | 8/2002 | Chen et al. | |
| 6,466,888 B1 | 10/2002 | McCool et al. | |
| 6,473,524 B1 | 10/2002 | Reda et al. | |
| 6,546,342 B1 | 4/2003 | Dougherty et al. | |
| 6,564,125 B2 | 5/2003 | Pattok et al. | |
| 6,574,271 B2 | 6/2003 | Mesecher et al. | |
| 6,690,660 B2 | 2/2004 | Kim et al. | |
| 6,747,481 B1 | 6/2004 | Pitts | |
| 6,795,794 B2 | 9/2004 | Anastasio et al. | |
| 6,889,165 B2 | 5/2005 | Lind et al. | |
| 6,898,584 B1 | 5/2005 | McCool et al. | |
| 6,944,244 B2 | 9/2005 | Belotserkovsky et al. | |
| 6,947,855 B2 | 9/2005 | Verbrugge et al. | |
| 6,970,804 B2 | 11/2005 | Siegel et al. | |
| 6,988,056 B2 | 1/2006 | Cook | |

OTHER PUBLICATIONS

Miguel A. Morales and David J. Haas, "Adaptive Sensors for Aircraft Operational Monitoring," AIAA 2004-1892, 12 pages, $45^{th}$ AIAA/ASME/ASCE/AHS/ASC Structures, Structural Dynamics and Materials Conference, Apr. 19-22, 2004, Palm Springs, California.

Miguel A. Morales and David J. Haas, "Adaptive Sensors for Aircraft Operational Monitoring," Computer Sciences Corporation (CSC), Falls Church, Virginia, Leading Edge Forum Technology Programs, CSC Papers 2005; available on the CSC website at http://www.csc.com/aboutus/lef/mds67_off/uploads/CSCPaper2005_AdaptiveSensors.pdf, 21 pages printed out on or about Feb. 2006.

R. G. Adams, K. Butchart, and N. Davey, "Hierarchical Classification with a Competitive Evolutionary Neural Tree," *Neural Networks*, vol. 12, No. 3, pp. 541-551 (Apr. 1999).

Paul Rigby and Stefan B. Williams, Adaptive Sensing for Localisation of an Autonomous Underwater Vehicle, Australasian Conference on Robotics and Automation (ACRA), Dec. 5-7, 2005, Sydney, Australia; available on the Australian Robotics and Automation Association Inc. (ARAA) website at http://www.araa.asn.au/acra/acra2005/papers/rigby.pdf, 7 pages printed out on or about Feb. 2006.

* cited by examiner

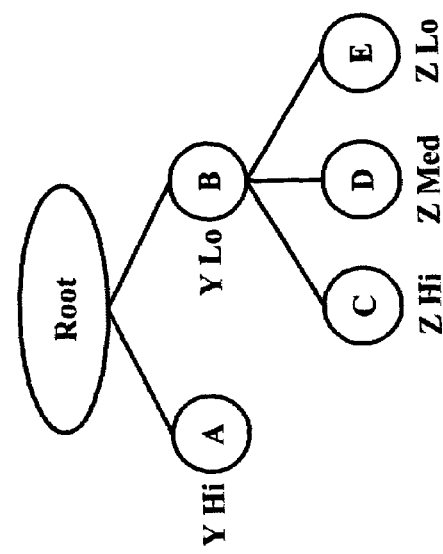
FIG. 8
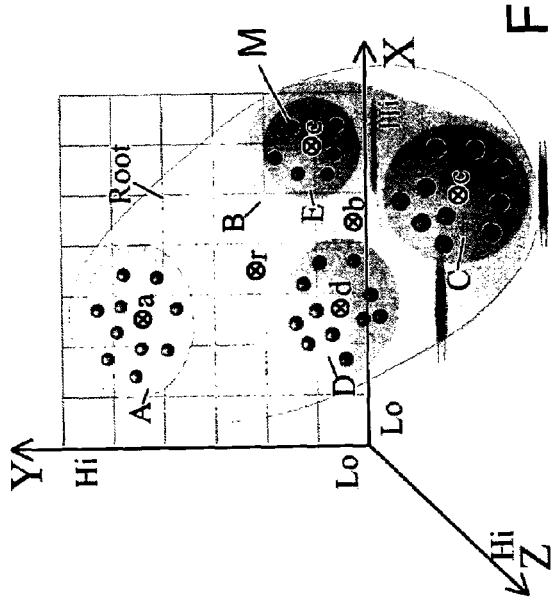
FIG. 7
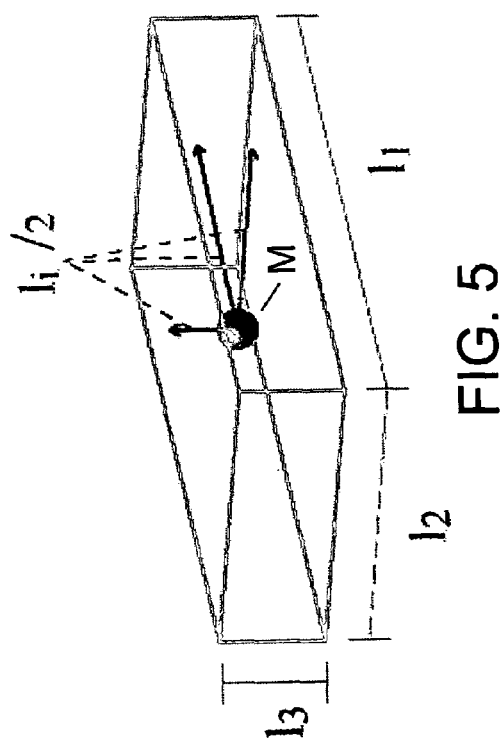
FIG. 5
FIG. 6

Original knowledge base flight test data

| Data Source | Aircraft Model | Useful Time (sec) |
|---|---|---|
| 1 | SH-60R | 486 |
| 2 | SH-60B | 5,799 |
| 3 | HH-60J | 416 |

Data contents and knowledge base improvements

| Time | Flights Processed | Additions to Knowledge Base (nodes) |
|---|---|---|
| Update 1 | 7 | 3 (48-50) |
| Update 2 | 11 | 11 (51-61) |
| Validation | 24 | N/A |

SMART SENSOR CONTINUOUSLY ADAPTING TO A DATA STREAM IN REAL TIME USING BOTH PERMANENT AND TEMPORARY KNOWLEDGE BASES TO RECOGNIZE SENSOR MEASUREMENTS

CROSS-REFERENCE TO RELATED APPLICATIONS

This application claims the benefit of U.S. provisional application No. 60/656,511, filed 25 Feb. 2005, hereby incorporated herein by reference, entitled "Adaptive Sensors for Aircraft Operational Monitoring," joint inventors Miguel A. Morales and David J. Haas.

STATEMENT OF GOVERNMENT INTEREST

The invention described herein may be manufactured and used by or for the Government of the United States of America for governmental purposes without payment of any royalties thereon or therefor.

BRIEF DESCRIPTION OF THE COMPUTER PROGRAM LISTING APPENDIX

Incorporated herein by reference is a Computer Program Listing Appendix, which sets forth an embodiment of computer source code in accordance with the present invention. The inventors refer to this embodiment of their computer program product as "ADAPTIVE SENSOR." This Computer Program Listing Appendix is contained as a text document that was created on 24 Feb. 2006 in a CD-R compact disc that is now situated in the application file. The CD-R compact disc contains one data file in ASCII file format, about 489 KB, entitled "Adaptive Sensor Source Code.txt."

BACKGROUND OF THE INVENTION

The present invention relates to "smart" sensors, more particularly to algorithms for effecting adaptive learning by standard sensors.

Sensors have been referred to as "smart" if their information can be manipulated to achieve a specific outcome. According to a typical smart sensor, this manipulation of information is accomplished mainly through the use of simple rules. In principle, perhaps even one rule would suffice to attach the "smart" label to a sensor, notwithstanding the limited functionality of a single-rule brand of "smartness"; nevertheless, a smart sensor is usually characterized by plural rules. As smart sensor technology continues to develop, these rules are becoming increasingly numerous and interdependent, and are being modularized into software constructs known as "intelligent agents." See Stuart Russell and Peter Norvig, *Artificial Intelligence: A Modern Approach*, Prentice Hall, Second Edition, 20 Dec. 2002.

Currently known smart sensors carry out tasks of greater complexity than in the past, but remain a function of the derived knowledge of some expert. It would be desirable for a smart sensor to be capable of deriving its knowledge directly from its measured data using data processing algorithms. The development of a robust strategy for sensor adaptation during regular operations would constitute an important advance in the evolution of sensor technology. Artificial neural networks have been considered for achieving new-generation smart sensors that are attributed with some form of adaptability. See Laurene V. Fausett, *Fundamentals of Neural Networks: Architectures, Algorithms and Applications*, Prentice Hall, 9 Dec. 1993; however, neural networks are significantly limited, as their models provide little physical insight into a given problem and require many examples to achieve a good understanding of the problem.

SUMMARY OF THE INVENTION

In view of the foregoing, it is an object of the present invention to provide a methodology for effecting a kind of sensor "smartness" whereby the sensor "learns" (acquires knowledge) entirely on its own in an adaptive manner and on a continuous basis.

The present invention provides an "adaptive" sensor methodology according to which "learning" is conducted outside a controlled environment. Viability of the inventive methodology presupposes that a sensor is properly calibrated and does not malfunction. The present invention succeeds in harnessing and implementing new knowledge in shorter periods of time; in fact, new knowledge can be utilized as soon as it becomes available. According to typical inventive practice, the capability and functionality of a sensor are minimal at inception and gradually build up to high standards. This growth process can take place as part of regular operations, thereby obviating dedicated data collection and testing and attendant costs.

A typical inventive method for effecting smart sensing comprises: (a) classing a current observation as being either recognized or unrecognized in the context of a permanent knowledge base; (b) if the current observation is classified as being recognized, determining whether an outcome associated with the recognized current observation is consistent with an outcome of at least one other measurement that exists in the permanent knowledge base and that constitutes a basis for the recognition; (c) if the outcome associated with the recognized current observation is consistent with an outcome of at least one other measurement, assimilating information into the permanent knowledge base, the assimilated information including the recognized current observation and at least one characteristic of the recognized current observation; if the current observation is classified as being unrecognized: (d) categorizing the unrecognized current observation in a hierarchal structure in a temporary knowledge base, (e) associating the current observation with an outcome, and (f) determining whether the unrecognized current observation is corroborated; if the unrecognized current observation is determined to be corroborated, (g) assimilating, into the permanent knowledge base, information that includes the corroborated current observation and at least one characteristic of the corroborated current observation. The corroboration typically includes: (i) recognition of the unrecognized current observation in view of at least one other observation is subsequently caused $t_0$ exist in said temporary data base, and (ii) consistency of the outcome associated with the unrecognized current observation with an outcome of at least one other measurement that is subsequently caused to exist in the temporary data base. According to frequent inventive practice, the unrecognized current observation is placed in a first temporary knowledge base (e.g., a temporary depository) until the conclusion of the event run (e.g., flight) during which the unrecognized current observation has been rendered, whereupon the unrecognized current observation is placed in a second temporary knowledge base.

The present invention's advanced algorithm improves sensor capabilities through effectuation of an adaptive strategy involving the extraction, categorization and fusion of sensor data. Integration of the present invention's strategy with standard sensors results in an inventive adaptive sensor that can improve its functionality over time; that is, an inventive adaptive sensor is capable of continuous learning, resulting in continuous improvement. In addition, the present invention's adaptive strategy is designed to preclude propagation of incorrect information, a common problem in conventional learning models. The present invention's robust strategy for sensor adaptation during regular operations is believed by the present inventors to represent a significant advance in the evolution of sensor technology.

Fundamentally, the present invention's adaptive sensor is a robust paradigm for continuous learning suitable for implementation in a variety of endeavors. According to typical inventive practice, the primary functions of the inventive adaptive sensor are to determine relationships between multiple parameters directly from measured data, and to produce one or more quantities of value for an examiner or user. The inventive algorithm is capable—in real time—of recognizing and assimilating new information, corroborating previous information, and identifying inconsistencies in the data stream. The inventive algorithm also possesses a natural resiliency against error assimilation and ultimately improves sensor capabilities with time.

The inventive adaptive sensor determines relationships between multiple parameters directly from measured data in real time outside a controlled environment. The present invention's unique operation integrates an adaptation process that allows these relationships to improve with time as the algorithm expands its knowledge base dynamically. In addition, the relationships remain valid at every step of the process through the adjustment of the algorithm's operating domain. Ultimately, the inventive adaptive sensor produces a quantity of value for an examiner or user that can be readily assimilated or used to perform decisions. This process can take place as part of regular operations, thereby bypassing the need and cost of dedicated data collection, as well as improving the turnaround time for the use of new information.

The inventive adaptive sensor exhibits "adaptation" in the sense that its capabilities result, over time, in improvements to sensor functionality. The knowledge structure utilized by the inventive adaptive sensor is hierarchical and localized and, as such, possesses a natural resiliency against error assimilation. A typical adaptive sensor in accordance with the present invention features the estimation of physical quantities by one or more standard sensors (sensing elements), and the capability to manipulate and learn from that information. For instance, an airspeed indicator produces a reading based on differential pressure, not actual airspeed; that is, through the use of a well known physical relationship, the airspeed sensor determines airspeed by processing associated measurements.

The present invention's adaptation methodology presupposes that knowledge assimilation is gradual, continuous, cumulative and has no natural termination. The inventive methodology is thus designed to acquire and incorporate new information for as long as it is active. As typically embodied, the present invention features independent mechanisms for observation, recognition, categorization, association and assimilation. According to typical inventive practice, these mechanisms are integrated together in order that the entire inventive process be fully automated.

Observation is an activity that is carried out directly by a sensor. Each time a sensor takes a measurement, it is, in effect, performing an observation that may contain essential new knowledge. Before the present invention's assimilation of new information is to take place, each current measurement must first be classified as recognized ("known") or unrecognized ("unknown").

The assessment of a current measurement as being "known" indicates that the current measurement is sufficiently similar to a measurement previously incorporated into the knowledge base. If, in addition, the outcome is consistent with one or more previous measurements' outcomes in the same known region, the information contained in the measurement is assimilated directly into its corresponding unit in the knowledge structure, thereby increasing confidence in that piece of knowledge.

In contrast, an assessment of a current measurement as being "unknown" indicates that the current measurement is distinct from all information stored in the knowledge base. As a result, the current measurement must first be categorized and associated.

Categorization serves to associate the current measurement with elements in the knowledge base that are similar to it from a global perspective. This allows the assignment of general attributes to measurements that fall within a given group, as well as the determination of boundaries for those properties.

Once the measurement has been categorized, it is then associated with a particular outcome. The association of a monitored state with an outcome constitutes a goal of the present invention's adaptive sensor. The inventive association includes relating the measured value of one or more parameters representing a physical state to the value of another parameter that is presumed to be dependent on these quantities such that $$P=f(x_1, x_2, x_3 \ldots x_n) \qquad (1)$$

where P is the value of the parameter of interest and is a function of n variables being measured by an array of sensors. However, because the existence of such a relationship is uncertain, measurements must be verified in every instance. If a dependent relationship exists, it is expected that similar measurements taken in subsequent instances will result in a close approximation to the dependent parameter value originally recorded such that $$P \approx f(x_1 + \Delta x_1, x_2 + \Delta x_2, x_3 + \Delta x_3, \ldots x_n + \Delta x_n) \qquad (2)$$

holds true for $\Delta x_i$ sufficiently small.

In order to prevent the formulation of an invalid relationship, a mechanism for knowledge assimilation is utilized. While the association of quantities is performed for every measurement that has been recognized as unknown, their assimilation does not take place unless and until there is sufficient corroboration that the association being considered is valid and reliable. Independent events must be defined in accordance with the application in order to serve as the sources for corroboration. For instance, in the case of commercial aircraft operations, different flights may serve as independent events. In the case of trucking business operations, different road trips may serve as independent events.

Once an association has been successfully corroborated, it is assimilated and becomes part of the permanent knowledge base. With the assimilation of new knowledge, the adaptation process as to such new knowledge has been completed and the sensor has successfully improved its capabilities by virtue of having enhanced its knowledge base. If the association, however, shows inconsistencies during corroboration, assimilation does not take place.

The present invention represents a strategy that is capable of continuous learning, is insensitive to error propagation, and results in continuous improvements in sensor capabilities. The inventive disinclination to error propagation is especially beneficial for measurements taken "in the field" (i.e., outside a controlled environment), which are especially at risk of containing incorrect information. Most conventional learning strategies take a global approach at capturing knowledge. A variety of conditions, including sensor malfunction and/or improper sensor calibration, can rapidly propagate incorrect information through conventional learning paradigms, and can even result in the complete loss of previously learned and validated relationships. Conventional learning paradigms such as Back-Propagation (See the aforementioned Laurene V. Fausett, *Fundamentals of Neural Networks: Architectures, Algorithms and Applications*) are noteworthy for distributing knowledge across their basic knowledge structure units known as "nodes." As a result, incorporation of new knowledge is necessarily distributed through the entire structure. The degree to which new knowledge is assimilated on this type of paradigm can be controlled through a variable referred to as the "learning rate." The learning rate is an empirical number the determination of which is challenging for optimal performance.

The present invention's adaptation methodology overcomes a particularly difficult problem of conventional continuous learning paradigms, namely, their dependence on learning rate to control the degree to which new information is assimilated. Learning rate is a particularly challenging quantity to determine for optimal performance. The problems associated with the learning rate variable are two-fold, viz., the trivialization of new information by a low (slow) learning rate, and the overemphasis of new information by a high (fast) learning rate. In the absence of any approach for setting the proper learning rate value, the risk of model degradation (e.g., in terms of non-assimilation of new information, or loss thereof) is high. A variety of conditions, such as sensor malfunction and/or improper sensor calibration, can rapidly propagate incorrect information through conventional learning paradigms, and can even result in the complete loss of previously learned and validated relationships. This is because these conventional learning strategies take a global approach to capture and distribution of knowledge, capturing and distributing the knowledge across their entire structure.

Unlike distributed learning strategies, the present invention's methodology utilizes a localized learning approach in which units are kept independent of each other. In this way, errors are not propagated through the structure, but rather are confined to the particular unit or units associated with that event. Once an error is discovered, the affected units can be readily identified and deleted, or they can be marked and used to identify similar errors in the future. Moreover, according to typical embodiments of the inventive methodology, information is not trivialized, since each unit, though independent, is equally significant in the inventive model, and is in fact accessed directly when required.

The present invention has no limitation regarding the number of examples necessary to construct a valid model. Conventional multi-dimensional modeling techniques and paradigms, such as those involving artificial neural networks, are significantly limited because they require a significant number of examples to achieve a good understanding of a given problem, and further because they have no available way of determining when a reliable number of examples has been reached. The present invention's adaptive sensor are not beset with such shortcomings, since the sensor's capabilities and functionality can be minimal at inception and can gradually build up to high standards.

The inventive model is valid and unbiased at every step of its construction. The present invention provides a unique strategy for continuous learning. As distinguished from conventional paradigms, the inventive adaptive sensor is largely insensitive to error assimilation and propagation, and generates a hierarchical structure of its knowledge base. The present invention's ability to model a problem is superior in analysis and understanding. In marked contrast are artificial neural networks, which have been disparagingly referred to as "black boxes" for their inability to model a problem in an intuitive fashion.

Modeling multi-dimensional parameter interdependencies directly from measured data is a challenging activity because the relationships are usually poorly understood and the information is often incomplete. Artificial neural networks have proven to be suitable for application to such problems due to their high learning curve; yet, they have several disadvantages. Their resulting models provide little physical insight into a problem, they utilize the learning rate parameter for learning, they require a significant number of examples to achieve a good understanding of a problem, and they have no way to determine when a reliable number has been reached. Other techniques can be utilized, such as regression and expert systems, but they are not as adept as artificial neural networks at modeling complex multi-dimensional relationships and boundaries. Neither artificial neural networks nor any of the other conventional techniques possess a hierarchical and localized knowledge structure. The present invention's hierarchal and localized knowledge structure uniquely succeeds in preventing the assimilation of errors in the data stream.

The present invention's advanced algorithm can execute the extraction, categorization and fusion of sensor data, thereby improving sensor capabilities. Integration of the inventive strategy with standard sensors results in an inventive adaptive sensor that is capable of improving its functionality over time. The present invention's adaptation methodology is suitable for application on sensors of practically any kind. The imparting of data-processing capabilities to standard sensors is becoming increasingly commonplace, as such data-processing-capable devices provide information that can be directly used, and the gathering of information by monitoring systems is becoming increasingly routine. The present invention does not entail sensor calibration. Rather, the present invention provides a methodology that is capable of optimizing the utilization of available information. Sensors that utilize more than one measurement to display their information are particularly well suited for inventive practice. The inventive adaptive sensor represents a robust paradigm for continuous learning, is designed to withstand the rigors associated with implementation outside a controlled environment, and is capable, in real time, of recognizing and assimilating new information, corroborating previous information, and identifying inconsistencies in the data stream.

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 3 depicts the taking of measurements at times $t_1$ and $t_n$. FIG. 4 depicts the mapping of the measurements to particular locations in three-dimensional space.

FIG. 5 is a schematic illustrating the general case of a confidence interval in three dimensions in accordance with a typical embodiment of the present invention.

FIG. 6 and FIG. 7 are schematics that together illustrate the development of a tree structure (depicted in FIG. 7), from measurements in three-dimensional space (depicted in FIG. 6), in accordance with a typical embodiment of the present invention.

FIG. 8 is a table setting forth the four types of sensor measurements that were taken during helicopter-associated testing of the present invention. The four different sensors were situated onboard each helicopter for purposes of determining gross helicopter weight during steady hover conditions.

DETAILED DESCRIPTION OF THE INVENTION

Figure 1:
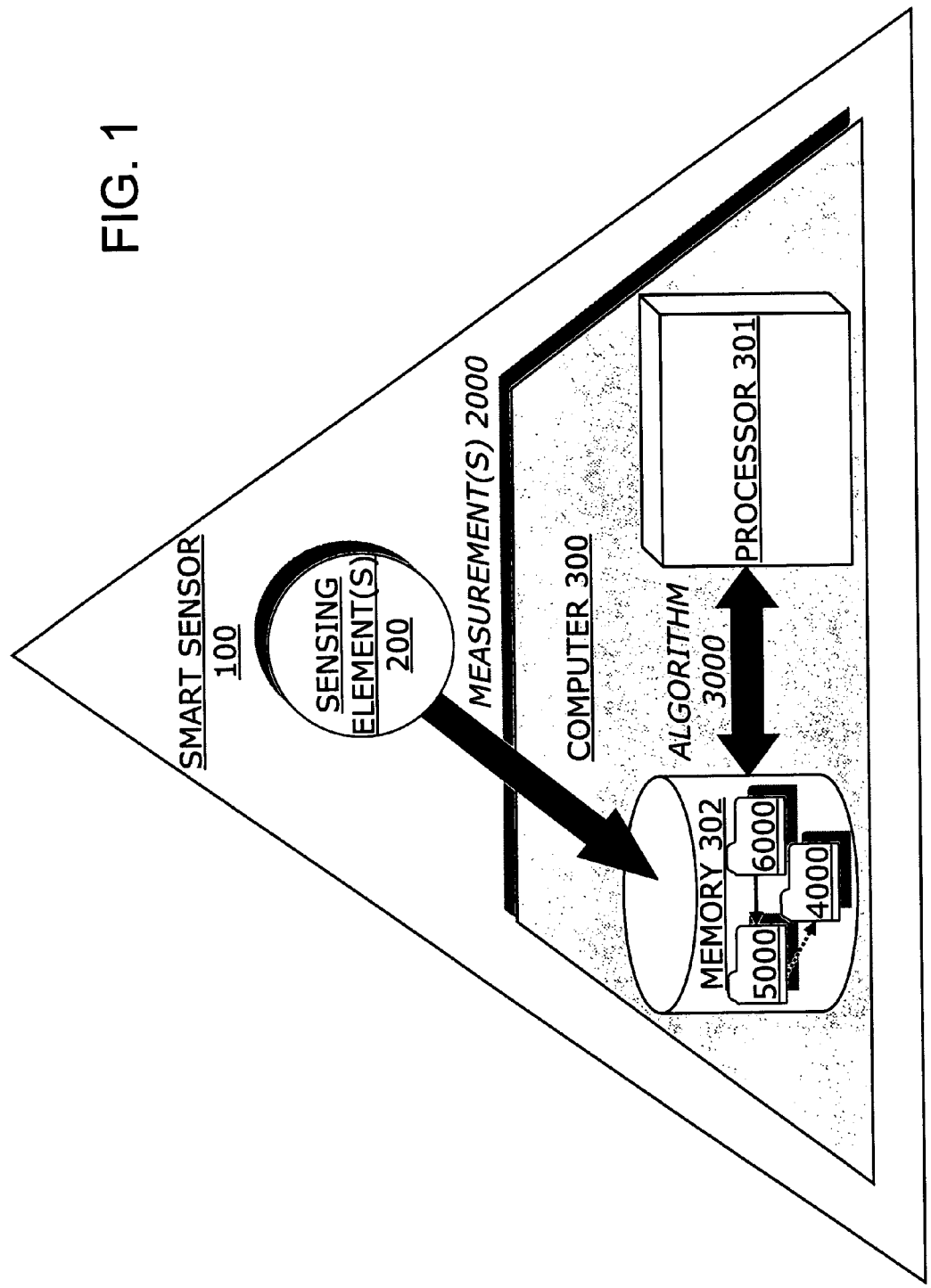
FIG. 1 is a schematic illustrating a typical sensor that is attributed with "smartness" in accordance with a typical embodiment of the present invention.
Figure 2:
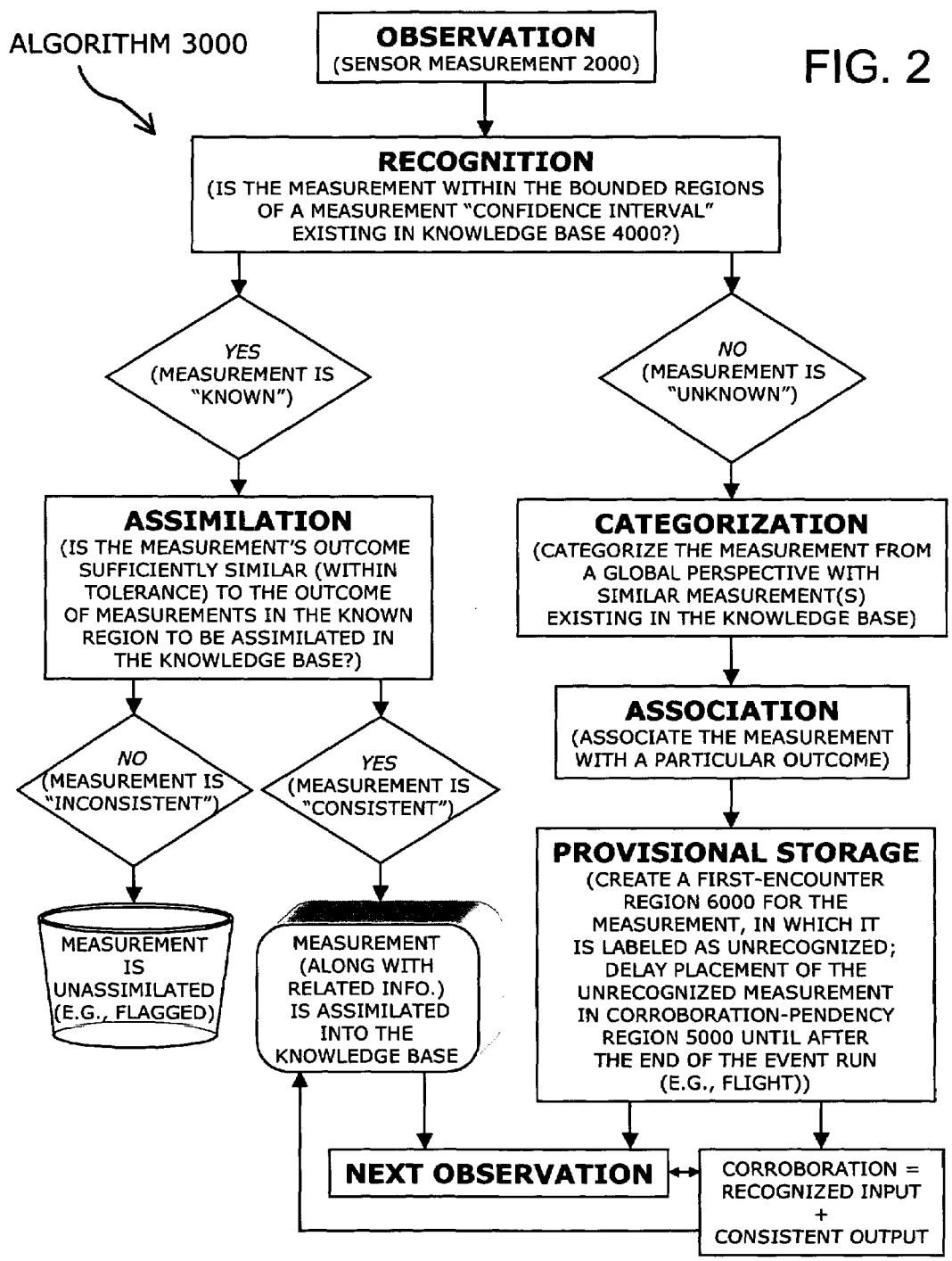
FIG. 2 is a flow diagram illustrating the overall algorithmic control logic in accordance with a typical embodiment of the present invention.

Referring now to FIG. 1 and FIG. 2, the present invention's smart sensor 100 includes a sensing element 200 and a computer 300, which includes a processor 301 and a memory (storage) 302. Computer 300 stores in its memory 302 information including the following: the present invention's algorithm 3000, which is processed by processor 301; provisional storage regions 6000 and 5000, which contain the uncorroborated measurements (observations) 2000 that are rendered by at least one sensing element 200, along with related information including inventively processed information pertaining to the corresponding categorizations and/or associations of the measurements 2000; and, knowledge base 4000, into which are assimilated only those measurements 2000 (along with related information including inventively processed information pertaining to the corresponding categorizations and/or associations of the measurements 2000) that quality for assimilation in accordance with the present invention's algorithm 3000. According to frequent inventive practice, plural (e.g., multiple) sensing elements 200 are connected to computer 300 in the same inventive smart sensor 100 system.

Algorithm 3000 performs a first threshold determination, viz., as to whether a newly rendered (current) measurement 2000 by a sensing element 200 is "known" (synonymously referred to herein as "recognized," "recognizable" or "familiar") or "unkown" (synonymously referred to herein as "unrecognized," "unrecognizable" or "unfamiliar"). This first threshold determination includes comparison of the newly rendered measurement 2000 with at least one previously rendered measurement that has been previously assimilated into knowledge base 4000. If the first threshold determination is that the newly rendered measurement 2000 is known, the newly rendered measurement 2000 is compared to a second threshold to determine whether the measurement-associated outcome is consistent with (e.g., within an assigned tolerance of) the previous measurement associated outcome(s). If this second threshold determination is that such consistency exists, the measurement characteristics are assimilated into knowledge base 4000 (which is contained in memory 302).

Pursuant to the first threshold determination, inventive algorithm 3000 assesses a newly rendered measurement 2000 to be "known" if the current measurement 2000 is considered by inventive algorithm 3000 to be sufficiently similar to a measurement that has been previously incorporated into the knowledge base 4000. If the newly rendered measurement 2000 is deemed known, then the activities of categorization and association are not performed, since categorization and association have previously been defined for one or more previously assimilated measurements 2000 (i.e., previously assimilated into knowledge base 4000) with respect to which the current measurement 2000 is jointly categorized and similarly associated. If the "known" measurement is deemed "consistent" pursuant to a second threshold determination, the details of the information contained in the known newly rendered measurement 2000 are assimilated into knowledge base 4000. If the "known" measurement is deemed "inconsistent" pursuant to the second threshold determination, none of the information contained in the known newly rendered measurement 2000 is assimilated into knowledge base 4000. This "consistency-versus-inconsistency determination inquires whether the measurement's outcome is sufficiently similar to (within tolerance of) the outcome(s) of measurement(s) in the known region to be assimilated in the knowledge base 4000.

If the newly rendered measurement 2000 is deemed "unknown," then the activities of categorization and association are performed. A newly rendered measurement 2000 that is deemed unknown is one which is distinct from all information already stored in knowledge base 4000, and hence requires further processing prior to the possibility of assimilation of newly rendered measurement 2000.

Inventive association includes the relating of the value of one or more parameters representing a physical state to the value of another parameter such that the aforementioned Equation (1) holds true. Furthermore, the inventive methodology postulates that the aforementioned Equation (2) holds true for $\Delta x_i$ sufficiently small. An important aspect of inventive association is the notion of the "confidence interval," viz., the region of multi-dimensional space that can be associated with a particular value of a dependent parameter with known certainty of being within a prescribed error margin. Inventive assimilation takes place if certain conditions are met; in particular, the processes of recognition and association determine whether assimilation will occur. In accordance with typical embodiments of the present invention, upon the rendering of a new measurement 2000, there are four possible scenarios, as follows: (a) measurement in known space with consistent association; (b) measurement in known space with inconsistent association; (c) measurement in unknown space with consistent association; and, (d) measurement in unknown space with inconsistent association.

A consistent measurement in known space is defined in accordance with the relationship $|P_{measurement}| \leq |P_{region} \pm E|$, where E is the error margin or tolerance. If known and consistent, assimilation of the newly rendered measurement 2000 in knowledge base 4000 takes place. The region centroid location is modified, the parameter association is modified, and confidence is increased. As the number of measurements becomes large, modifications become insignificant and the region reaches stability.

An inconsistent measurement in known space is defined in accordance with the relationship $|P_{measurement}| > |P_{region} \pm E|$. If known and inconsistent, assimilation of the newly rendered measurement 2000 in knowledge base 4000 does not takes place. The region cetroid location is not modified, the parameter association is not modified, and the event is flagged as inconsistent.

For a measurement in unknown space, a new temporary region (node) is generated having the characteristics of the newly rendered measurement 2000, including its association. Actually, according to typical inventive practice, this new information is initially placed in a "first-encounter" provisional storage region 6000. At the conclusion of the event (e.g., the flight), the same information is placed in a different storage region, viz., corroboration-pendency storage region 5000, which represents a temporary knowledge base similarly as knowledge base 4000 represents a permanent knowledge base. The information is situated in corroboration-pendency storage region 5000 awaiting possible corroboration. If at some future point in time the unknown measurement (situated in corroboration-pendency storage region 5000) is found to be recognized and consistent (i.e., one or more similar measurement from one or more distinct, subsequent events corroborate(s) the region), the region becomes permanent (i.e., is assimilated into knowledge base 4000). If, on the other hand, at no time is the unknown measurement found to be both recognized and consistent (i.e., no similar measurement from a distinct, subsequent event corroborates the region), the region remains inconsistent; that is, the inconsistent measurement does not become permanent (i.e., is not assimilated into knowledge base 4000). In other words, the term "corroboration" as used herein in the context of inventive practice refers to the conjunction of recognized input and consistent output; that is, [corroboration]=[recognition of measurement input]+[consistency of measurement output, i.e., associated outcome].

As noted hereinabove, if the first threshold determination is that the newly rendered measurement 2000 is unknown, then the newly rendered measurement 2000 is categorized and associated. The newly rendered measurement 2000 is categorized (e.g., grouped) together with at least one previously rendered measurement that has been previously assimilated in the data representation. The measurement 2000 can also comprise its own category if sufficiently different from all other measurements resident in the knowledge base 4000. This is especially true at the start of the inventive learning process. Further, the newly rendered measurement is associated with a physical phenomenon that bears a physical relationship with the newly rendered measurement. Categorization of a newly rendered measurement 2000 serves to develop a hierarchical structure for the knowledge base 4000. The association of the newly rendered measurement 2000 includes relating newly rendered measurement 4000 to a physical parameter that is a function of at least one variable. In other words, association includes the establishment or definition of a relationship between an observation and at least one physical parameter, wherein the relationship is characterized by variation of at least one physical parameter in accordance with at least one other physical parameter, at least one physical parameter being representative of the observation or the observation's category. Typically, newly rendered measurement 2000 is a "raw" measurement representing a first physical parameter that bears a relationship to at least a second physical parameter that differs from the first physical parameter and that tends to be more meaningful or informative in the context of the application.

Categorization and association having been performed by algorithm 3000, algorithm 3000 then places the measurement on temporary (provisional) storage (i.e., in a "temporary" or "provisional" knowledge base), viz., corroboration-pendency region 5000, to await corroboration at the time a similar and independent event is encountered. Categorization involves the placement of a measurement within a hierarchical structure, typically placed with similar measurements. Until corroboration occurs (if it occurs), the measurement is not assimilated into the permanent knowledge base, viz., knowledge base 4000. Once corroboration occurs, the measurement is assimilated into the "permanent" knowledge base, viz., knowledge base 4000.

If the second threshold determination is that the newly rendered measurement 2000 and its association with another physical parameter are consistent, then the newly rendered measurement 2000 information, together with information pertaining to its categorization and/or association, is assimilated into knowledge base 4000. On the other hand, if the second threshold determination is that the newly rendered measurement 2000 and its association with another physical parameter are inconsistent, then the newly rendered measurement 2000 is not assimilated into knowledge base 4000. Some inventive embodiments provide for storage (e.g., for possible future reference) of known but inconsistent measurements 2000 in one or more special data sections of memory 302, such data sections being contained in memory 302 but being separated from permanent knowledge base 4000, temporary knowledge base 5000, and first-encounter base 6000, which are also contained in memory 302.

Note that a first threshold determination that a newly rendered measurement 2000 is known obviates the need for any of the subsequent activities including categorization and association. Knowledge base 4000 contains measurements 2000 that are known and consistent (e.g., including measurements 2000, deemed known pursuant to the first threshold determination and deemed within tolerance pursuant to the second threshold determination). The first and second threshold determinations are analogous in that both involve comparative reference to existing measurement 2000 data assimilated in knowledge base 4000. The first threshold determination is essentially whether the newly rendered measurement 2000 is "close enough" to any already assimilated measurement 2000 data; the second determination, in contrast, is essentially whether the newly rendered measurement 2000, has a similar association as the already assimilated measurement 2000 data.

Figure 4:
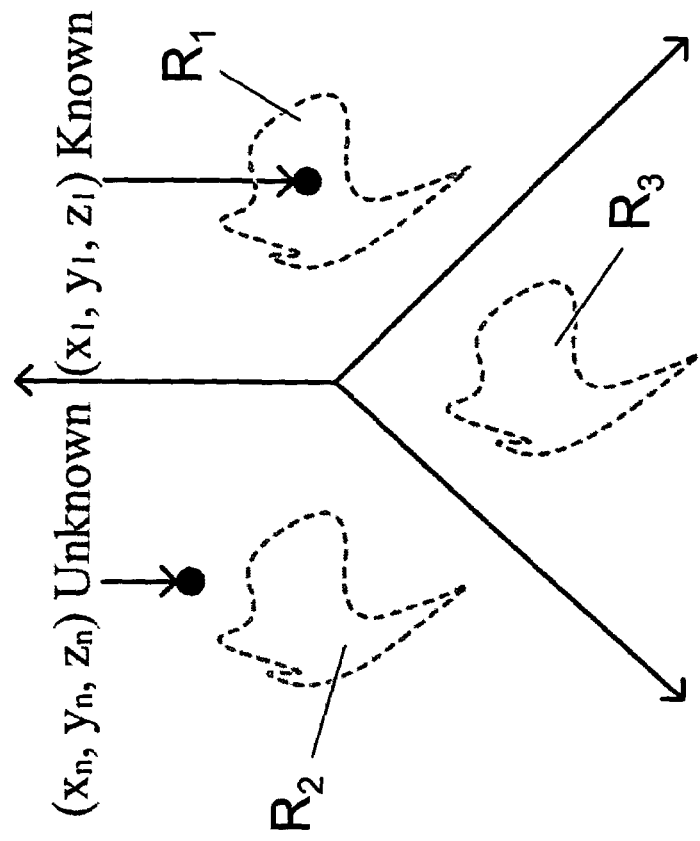
FIG. 3 and FIG. 4 are schematics that together illustrate measurement recognition in accordance with a typical embodiment of the present invention.
Figure 3:
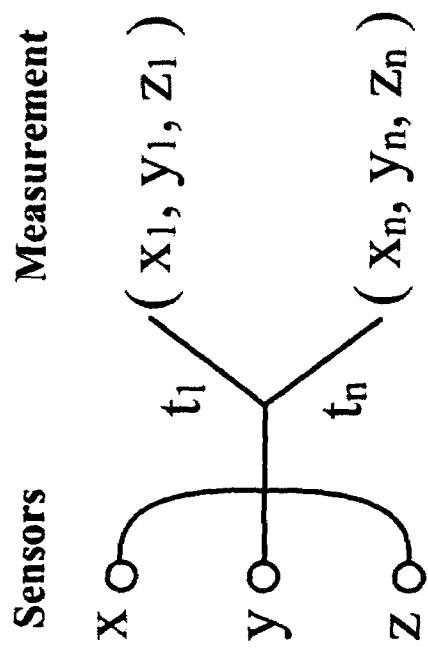

Reference is now made to FIG. 3 and FIG. 4, which are illustrative of the first threshold determination. FIG. 4, in particular, graphically depicts the present invention's activity of recognition (including the "known" versus "unknown" decision) in three-dimensional space. Sensors x, y and z take measurements at times $t_1$ and $t_n$ that map to particular locations in three-dimensional space. The dashed lines bound (enclose) regions R (regions $R_1$, $R_2$ and $R_3$ are shown in FIG. 4), where previous measurements have been taken and have been assimilated into knowledge base 4000. As a result, any measurement that falls inside of (within) regions R is considered to be known, while any measurements that falls outside of (without) regions R is considered to be unknown.

The activity of categorization serves to associate the newly rendered measurement 2000 with elements in knowledge base 4000 that, "from a global perspective," are similar to newly measurement 2000. General properties or attributes are assigned to measurements that are grouped together, and the parameters of the grouping are set. Once the newly rendered measurement 2000 has been categorized, it is then associated with a particular outcome. The categorization of newly rendered measurement 2000 facilitates the development of a hierarchical structure that can be particularly useful during detailed analysis of the inventive algorithm 3000. The ultimate objective of the present invention's adaptation process is the association of a monitored state with an outcome.

The association operation cannot be executed unless the desired outcome is itself being concurrently monitored. Relationships can only be established between monitored quantities. However, the value of establishing such relationships must be called into question if the desired outcome quantity is available to begin with. As it turns out, there are many instances where the inventive methodology has significant value. Some of the most notable examples include flight tests, lead-the-fleet programs (See D. White and E. Wagner, "Fatigue Life Analysis of Helicopter Dynamic Components in the U.S. Army Lead the Fleet Program," Proceedings of the 59$^{th}$ Annual Forum of the American Helicopter Society, Phoenix, Ariz., May 6-8, 2003, incorporated herein by reference), future fleets, back-up models and infrequent high risk/cost missions.

According to typical inventive embodiments, association includes relating one or more newly rendered measurements 2000, each reflecting a measured value of a physical parameter (e.g., a parameter representing a physical state), to the value of another physical parameter that is presumed to be dependent on these the newly rendered measurements 2000. This dependency is such that, $$P=f(x_1, x_2, x_3 \ldots x_n) \quad (1)$$

where P is the value of the dependent parameter of interest and is a function of n variables (newly rendered measurements 2000) being measured by plural (e.g., an array) of sensing elements 200. Because the existence of such a relationship is uncertain, measurements 2000 must be verified in every instance. If a dependent relationship exists, it is expected that similar measurements taken in subsequent instances will result in a close approximation to the dependent parameter value originally recorded such that $$P \approx f(x_1+\Delta x_1, x_2+\Delta x_2, x_3+\Delta x_3, \ldots x_n+\Delta x_n) \quad (2)$$

holds true for $\Delta x_i$ sufficiently small. This can be generalized to say that the value P is expected within a given tolerance $(P+\Delta P)$ within a confidence interval where the changes $\Delta x_i$ are defined.

Assuming that all sensing elements 200 are operating properly, if Equation (2) does not hold true for $\Delta x_i$ sufficiently small, then it can be concluded that the presumed relationship is incomplete or incorrect. Usually, there is a physical indication that the quantities considered are related prior to their study; nevertheless, if the extent of that relationship is unknown, then a reliable association may not be obtained. In order to prevent the formulation of an invalid relationship, a mechanism for knowledge assimilation is utilized in accordance with the present invention. The association of quantities is performed for every newly rendered measurement 2000 that has been deemed to be unknown pursuant to the first threshold inquiry; however, the assimilation of a given newly rendered measurement 2000 does not take place until there is sufficient corroboration that the association being considered is "consistent" (i.e., validates the previous measurement). According to typical inventive embodiments, corroboration is obtained from one or more events or contexts that differ from that which encompasses the newly rendered measurement 2000. For instance, in some applications pertaining to aircraft operations, corroboration takes place only on flights distinct from the flight in which the original recording is taken. In this way, the effects of sampling frequency and possible anomalous behavior can be removed.

Once an association of newly rendered measurement(s) 2000 has been successfully corroborated, that association is assimilated into knowledge base 4000. The association thereby becomes part of the permanent knowledge base of smart sensing device 100. With the assimilation of this new knowledge, the inventive adaptation process is complete as to this new knowledge, smart sensor 100 thus having successfully improved its capabilities by virtue of enhancing its knowledge base. If the association, however, shows inconsistencies during corroboration, assimilation does not take place. Furthermore, a substantial growth in the number of uncorroborated associations, with little or no assimilation, indicates that the parameter association in question is inappropriate and that a new parameter association needs to be formulated.

An important aspect of the inventive methodology is the assessment of similarity. The term "similarity" itself implies the existence of a reference from which comparisons can be drawn. This reference is also conceptualized as a region in the knowledge base 4000. Given that, according to typical inventive practice, multiple sensor measurements 2000 are being taken and associated to an outcome through the use of an implied relationship, each reference can be conceived to take the form of a single location in multi-dimensional space, where the corresponding measurement for each sensor 2000 constitutes a single dimension. From this reference, distances in every dimension can be prescribed to establish boundaries and define a confidence interval. FIG. 5 shows a confidence interval in 3-dimensional space drawn from a central reference location M.

As shown in FIG. 5, lengths $l_1/2$, $l_2/2$ and $l_3/2$ (each extending from reference location M) are assumed to be independent from one another, in correspondence with the general case. Different choices can be made, resulting in different shapes. For instance, if all three length components in the above example are taken to be the same, the resulting figure is a square, and calculating the magnitude of this 3-dimensional vector results in a sphere. Once a confidence interval is established, new measurements 2000 can then be compared to all available reference locations and be deemed to be similar or distinct. When a measurement 2000 is outside the confidence interval of all reference locations (i.e., outside the knowledge base 4000), that measurement 2000 is labeled as unknown. Because the present invention's learning process is ongoing, the reference locations and their outcome associations are allowed to change with time, but only based on measurements that are within its original confidence interval and are consistent with previous outcome values. The reference locations eventually reach a stability state where the number of measurements mapped is large and changes become trivial.

Reference locations M can also be arranged globally in accordance with a tree structure. For principles on tree structures, see Ellis Horowitz and Sartaj Sahni, *Fundamentals of Data Structures in PASCAL*, Computer Science Press, Inc., New York, N.Y., 1984. A tree-structure approach can permit the determination of features and properties that are region-specific in multi-dimensional space, thereby facilitating identification of sensor malfunctions and anomalies during implementation. FIG. 6 and FIG. 7 illustrate the formation of a simple tree structure (shown in FIG. 7) from a set of measurements in three-dimensional space (shown in FIG. 6, wherein measurements are represented as small spheres). The extensive light-colored three-dimensional (volumetric) region in FIG. 6, indicated as region "Root," covers the totality of measurements taken by sensors X, Y and Z and corresponds to the Root of the tree shown in FIG. 7.

Still referring to FIG. 6 and FIG. 7, these measurements 2000 can be further separated into groups possessing more specific qualities. For this example, the measurement from sensor Y is preserved at the top of the tree hierarchy, resulting in high Y measurements grouped inside elliptical three-dimensional region A and low Y measurements grouped inside irregularly shaped three-dimensional region B. Three dimensional region B can be further subdivided into high, medium and low Z measurements, resulting in elliptical (ellipsoidal) three-dimensional regions C, D and E respectively; these are positioned at the second hierarchical level. Sensor X measurements are medium and high, but have already been separated into elliptical (ellipsoidal) regions C, D and E due to the grouping of sensor Z measurements. At this point, the categorization task is completed and the tree halts its growth. Also indicated in FIG. 7 are the respective centroids for each three-dimensional region (i.e., centroid r for region Root; centroid a for region A; centroid b for region B; centroid c for region C; centroid d for region D; centroid e for region E. Note that centroid b (i.e., the centroid for region B) is outside regions C, D and E because of the two-dimensional categorizations for both X and Z.

EXAMPLE 1

Aircraft Airspeed

A traditional aircraft airspeed indicator displays a measure of the flow velocity based on the difference between total and static pressures as measured by a pitot-static probe. See Raymond W Prouty, *Helicopter Aerodynamics*, Rotor & Wing International, Phillips Publishing Company, June 1993. However, in order to translate differential pressure into airspeed, a relationship between these quantities is necessary. As a result, the measurement from the pitot-static probe undergoes some degree of processing before airspeed information can be presented to the pilot and hence conforms to the requirements set forth for adaptation. Furthermore, if true airspeed were selected for display on the indicator, temperature measurements would also be necessary, and compressibility effects would need to be calculated. This would result in multiple sensor measurement sources and additional processing. Naturally, as the complexity is increased, so does the knowledge necessary to carry out the task. The relationships that allow the calculation of airspeed from differential pressure in this example have been known for many years and can be applied seamlessly without concern. However, if these relationships were unknown, necessitated would be a robust strategy capable of extracting knowledge from collected measurements as they become available, such as provided by the present invention.

EXAMPLE 2

Flight Tests

During a flight test, an aircraft is extensively instrumented, but this level of instrumentation rarely migrates to the fleet. As a result, a substantial number of monitored quantities do not continue to be monitored during regular fleet operations; yet, their information may still be valuable to the pilot or an analyst. If relationships between the migrating monitored quantities and the non-migrating monitoring quantities can be established, additional information can be preserved. Lead-the-fleet programs are similar to flight tests in that a single aircraft is comprehensively instrumented and monitored in an effort to gather as much information as possible without going to the expense of instrumenting the entire fleet. In this case, however, the instrumented aircraft is required to fly a severe flight maneuvering envelope prior to other aircraft in the fleet in order to account for the variation in aircraft usage. This ensures that the usage for the entire fleet is covered. Since the instrumented aircraft is continuously monitoring multiple parameters in advance of the fleet aircraft, the knowledge extracted from this aircraft can immediately be used to benefit the remainder of the fleet as it becomes available. This example represents a type of situation that is well suited for an inventive adaptive sensor.

EXAMPLE 3

Future Monitoring Systems

Another good application area of the present invention's adaptive sensor technology is in the design of monitoring systems (e.g., for automobile or aircraft fleets, machinery in a factory, medical patients, etc.). This is because they allow the discovery of dependent parameter relationships and lead to the optimization of the parameters selected for monitoring a given system or process. Even when the same set of related parameters is monitored in the next generation system, their relationships can still be used to establish back-up models in the event outcome parameters malfunction or are lost. This prevents the loss of information that in some cases may last for an extended period of time until the problem is identified and fixed. Furthermore, the recognition and categorization functions in the inventive adaptation process can be used to corroborate adequate operation of the monitoring system, an approach that can be inventively practiced for quality assurance of the monitoring system. In addition, the inventive adaptive sensor algorithm can be applied as a data mining tool to automatically identify novelties in large quantities of monitored or recorded data.

EXAMPLE 4

Infrequent, High-Cost/High-Risk Missions

Another example of suitable applications for inventive technology is in high-risk and/or high-cost missions that are performed infrequently, such as NASA's Space Shuttle missions. In such applications, collected information is a highly valued commodity that demands thorough analysis. Any knowledge that can be extracted can be of critical value for the next mission. By their very nature in terms of need for information analysis and knowledge extraction, these applications are well suited for the present invention's adaptive sensor methodology.

EXAMPLE 5

Aircraft Gross Weight during Steady Hover

Reference is now made to FIG. 8 through FIG. 20. A prototype of the present invention's adaptive sensor is currently undergoing developmental flight testing onboard several Navy SH-60 helicopters. The function of this inventive adaptive sensor is to determine aircraft gross weight during steady hover conditions. The following paper, co-authored by the present inventors, discusses certain aspects of the present invention in general and the present invention's aircraft gross weight adaptive sensor embodiment in particular, and is incorporated herein by reference: Miguel A. Morales and David J. Haas, "Adaptive Sensors for Aircraft Operational Monitoring," 45th AIAA/ASME/ASCE/AHS/ASC Structures, Structural Dynamics and Materials Conference, 19-22 Apr. 2004, Palm Springs, Calif. The proceedings of this conference are available from the American Institute of Aeronautics and Astronautics (AIAA), website http://www.aiaa.org/.

This application is particularly well suited for the present invention's sensor adaptation because the original sensor had only limited information available to establish a relationship between gross weight and several monitored parameters. Informative regarding the relationship between gross weight and other parameters is another paper co-authored by the present inventors, viz., Miguel A. Morales and David J. Haas, "Feasibility of Aircraft Gross Weight Estimation Using Artificial Neural Networks," American Helicopter Society 57th Annual Forum, Washington, D.C., May 9-11, 2001, incorporated herein by reference.

The present invention's adaptive sensor strategy was integrated with sensors from an aircraft monitoring system, the U.S. Navy's SH-60 helicopter being designated the target application. In earlier testing, forty-two validation flights originating from three distinct aircraft (helicopters) were performed for purposes of evaluating this inventive prototype. More recent developmental flight testing has created an opportunity to further expand on the previous knowledge and improve sensor capabilities. As Morales and Hass note, the inventive technology has applicability to other aircraft systems as well. Aircraft sensing represents one (of many) technological areas having much potential for inventive practice, as it is desirable that the next generation of aircraft sensors be able to readily extract and assimilate knowledge as it becomes available to provide pilots, as well as data examiners, with information that can be readily assimilated or directly used to make decisions.

In accordance with the U.S. Navy's testing of the present invention's aircraft gross weight adaptive sensor, the gross weight information is shown to the pilot through the onboard HUMS cockpit display as it becomes available. A time-stamp defines when the estimation is obtained. During the flight test, the logging of aircraft gross weight is carefully controlled, providing the information necessary for improving the relationship. The motivation for constructing this embodiment of an inventive sensor stems from the need to automate the determination of gross weight. Often, poorly maintained logs and errors in estimating gross weight can result in the airframe being structurally penalized because the highest operational weight must be assumed in the absence of reliable data. In addition, keeping an accurate accounting of the aircraft gross weight during missions such as vertical replenishment (VERTREP) can be quite burdensome to the crew, especially during military operations in potentially hostile environments. As a result, the flight test can lend justification to the value of sensor adaptation because the information acquired during this time can be directly transferred to the rest of the fleet where automatic gross weight determination is desired.

The present invention's gross weight adaptive sensor as implemented on the SH-60 aircraft utilizes the measurements of four sensors in the HUMS system to ultimately determine the gross weight. These measurements and their ranges are shown in FIG. 8. Given the physics of the problem, the low radar altitude measurement is categorized into in-ground or out-of-ground effect. These are conditions that correspond to distinct flight regimes with significantly different aerodynamic characteristics. For pertinent information in this regard, see the aforementioned Raymond W. Prouty, *Helicopter Aerodynamics*. By performing this gross categorization of altitude, recognition of the current state is improved with only a minimal loss in accuracy due to the loss of continuity of the parameter.

The composite of the resulting measurements is a vector of four dimensions corresponding to a very specific location in multi-dimensional space. Vectors occupying neighboring locations possess very similar features, and when used to determine a relationship, they can be assumed to be associated with similar outcomes as stated hereinabove by Equation (2). The accuracy of this statement is in actuality a function of the gradient at each local region. Nevertheless, it is reasonable to assume that a sufficiently small region can be defined such that the gradient effects, if any, are negligible within the region allowing the grouping of these vectors or conversely a tolerance can be defined for the interval.

To conduct this operation in a structured fashion, a modified version of the Competitive Evolutionary Neural Tree or CENT network is utilized by the present invention as typically practiced. Informative regarding CENT neural trees is R. G. Adams, K. Butchart, and N. Davey, "Hierarchical Classification with a Competitive Evolutionary Neural Tree," *Neural Networks*, Volume 12, Number 3, April 1999, incorporated herein by reference. The main function of the CENT paradigm is to perform hierarchical classification of unlabelled datasets. The CENT has the ability to self-determine the number and structures of the competitive nodes in the network, without the need for externally setting parameters. Moreover, the CENT can halt the network's growth using locally calculated heuristics. These capabilities do away with the limitations encountered in cluster analysis and self-organizing maps, both of which require a preset number of nodes to perform their analysis.

However, modifications were significant and necessary because structure formation in the CENT is unstable and can take very different development paths dependent on the choices of a series of arbitrary empirical values and the order of the measurements processed. These properties are undesirable from the standpoint of repeatability and stability. Therefore, fundamental modifications were made to the CENT paradigm to correct these problems. While the concept of competition is kept, the concepts of activity, random competitive spawning, relative activity comparison, growth stimulation constant, growth potential and comparative Sum Squared Error (SSE) gain have all been discarded along with their associated empirical variable values. Without these concepts, the problem set-up complexity is reduced dramatically. In particular, the new approach has the advantages of ensuring accuracy of estimation within a known region, being insensitive to a large number of observations in the same space and implicitly providing a mechanism to halt new region formation. Furthermore, repeatability and stability are implicitly achieved.

As suggested by its name, the CENT makes use of a tree structure to represent the associations embedded in a given dataset. This has considerable advantages. Besides the well defined hierarchy, this strategy is inherently more stable than flat representations, as updates to the structure can be restricted to just the current sub-tree. Because measurement errors usually result in distinct vectors, the CENT strategy will immediately set these apart in a particular node or branch.

Figure 9:
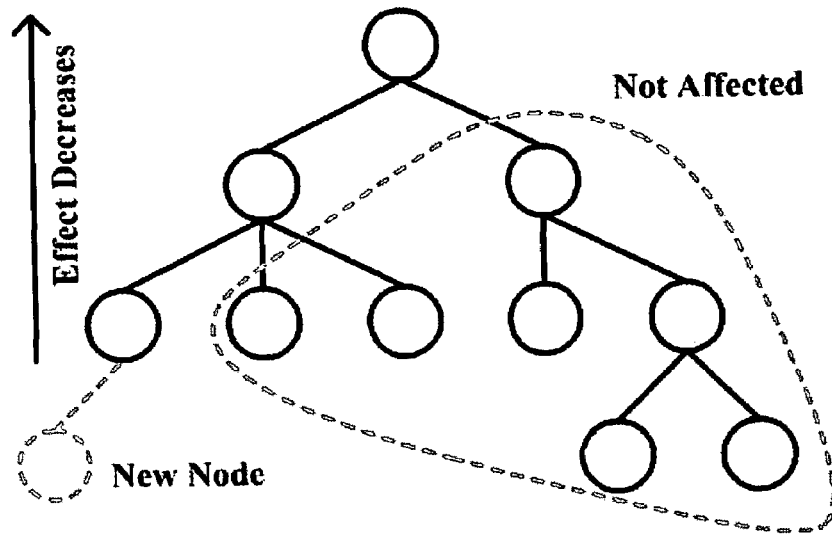
FIG. 9 is a schematic illustrating, in accordance with a typical embodiment of the present invention, the incorrect measurement effect on the inventive model when identified outside the knowledge base.
Figure 10:
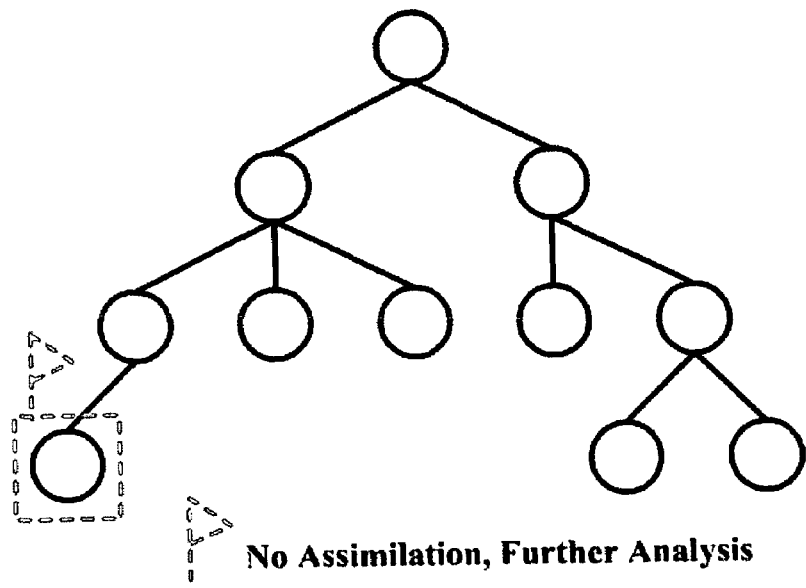
FIG. 10 is a schematic illustrating, in accordance with a typical embodiment of the present invention, the incorrect measurement effect on the model when identified within the knowledge base as inconsistent.

Since the present invention's algorithm 3000 as typically embodied incorporates principles of CENT, inventive algorithm 300 is characterized by a natural resiliency against bad data, and therefore excels at continuous learning. Even if the vector were to fall within a valid local group, the outcome value would be in sharp contrast with the prevalent value, and the invalid vector information would not be assimilated. Furthermore, the contradiction triggers an event indicating an inconsistency has been found so that further analysis can be performed. This eventually leads to the identification of sensor malfunctions. FIG. 9 and FIG. 10 illustrate these conditions. The case where a bad measurement falls within a valid local group with an associated outcome consistent with that group is also possible, but does not merit consideration since the inventive model is not affected.

With a hierarchical structure in place, the present invention's tasks of recognition and association can be easily implemented. Recognition is performed by using as a reference the centroid of local groups or nodes in the structure and enforcing the confidence intervals, such as discussed hereinabove with reference to FIG. 3 through FIG. 5. These intervals can be defined by design or by experiment, may vary or remain the same for every dimension and can be uniformly or individually applied to every node. In this study, the confidence interval is a hyper-rectangle corresponding to different levels of confidence for every dimension (general case), is uniformly applied to every node, and is determined by design. The first three measurements in FIG. 8 are expressed in percent. As a result, the confidence intervals are likewise defined in these terms. All intervals originally were constrained to be within ±5%; however, engine torque was further adjusted to ±3% and collective stick position to ±4%. Because radar altitude is categorized into in-ground and out-of-ground effects represented by a bi-polar number [0,1], it does not require a confidence interval. Radar altitude simply fits into a single state.

In order to enforce the confidence limit, the closest reference node to the new composite measurement must be identified first. This includes tentative new nodes (described below). This operation is accomplished by calculating the Euclidean distance between the vectors defined as $$E=\|X-Y_j\| \tag{3}$$

E is the Euclidean distance between the vector X and the $j^{th}$ node prototype $Y_j$. Equation (3) can be expanded in terms of the vector components to $$E=\|X-Y_j\|=\sqrt{(x_1-y_{j1})^2+(x_2-y_{j2})^2+\ldots+(x_n-y^{jn})^2} \tag{3.1}$$

Whenever a composite measurement is within the confidence interval of the closest reference node, it is considered to be recognized and is accordingly categorized in that node. Its information, specifically its associated outcome (gross weight for this case), is then compared to the prevailing associated outcome for the node. If the results are consistent, the new information is assimilated and used to increase confidence. Assimilation is carried out using Equation (4) and Equation (5), immediately set forth hereinbelow:

$$Y_{iNew} = \frac{((n \cdot Y_i) + X_i)}{(n+1)} \tag{4}$$

for the node's centroid and $$P_{yNew} = \frac{(n \cdot P_{yold} \cdot W(E_{new})) + (P_i \cdot W(E))}{(n \cdot W(E_{new}) + W(E))} \tag{5}$$

for the associated outcome, where $Y_i$ is the $i^{th}$ parameter centroid of the classifying node, $X_i$ is the $i^{th}$ parameter value for the current measurement vector, $P_{yold}$ is the current associated parameter outcome for the node, $P_{yNew}$ is the new associated parameter outcome for the updated node, $E_{new}$ is the Euclidean distance calculated from the previous node location to the new node location, E is the Euclidean distance between the current measurement vector and the new node location, W is a weight function and n is the total number of measurements previously classified by the node.

In the instant aircraft sensor application, a maximum error of ±500 lbs constitutes the desired error tolerance for every node. If this is not the case, the measurement 2000 is flagged as inconsistent and undergoes further analysis. The new information in this case is not assimilated. However, if the measurement 2000 is outside the confidence interval, a new tentative node is created. Nodes of this type are not part of the knowledge base 4000, but are kept for an extended period of time in separate storage until they can be corroborated by a subsequent measurement 2000 from a distinct flight. Only when this node is successfully corroborated is it assimilated and becomes a permanent part of the knowledge base 4000.

Figures 11, 12:
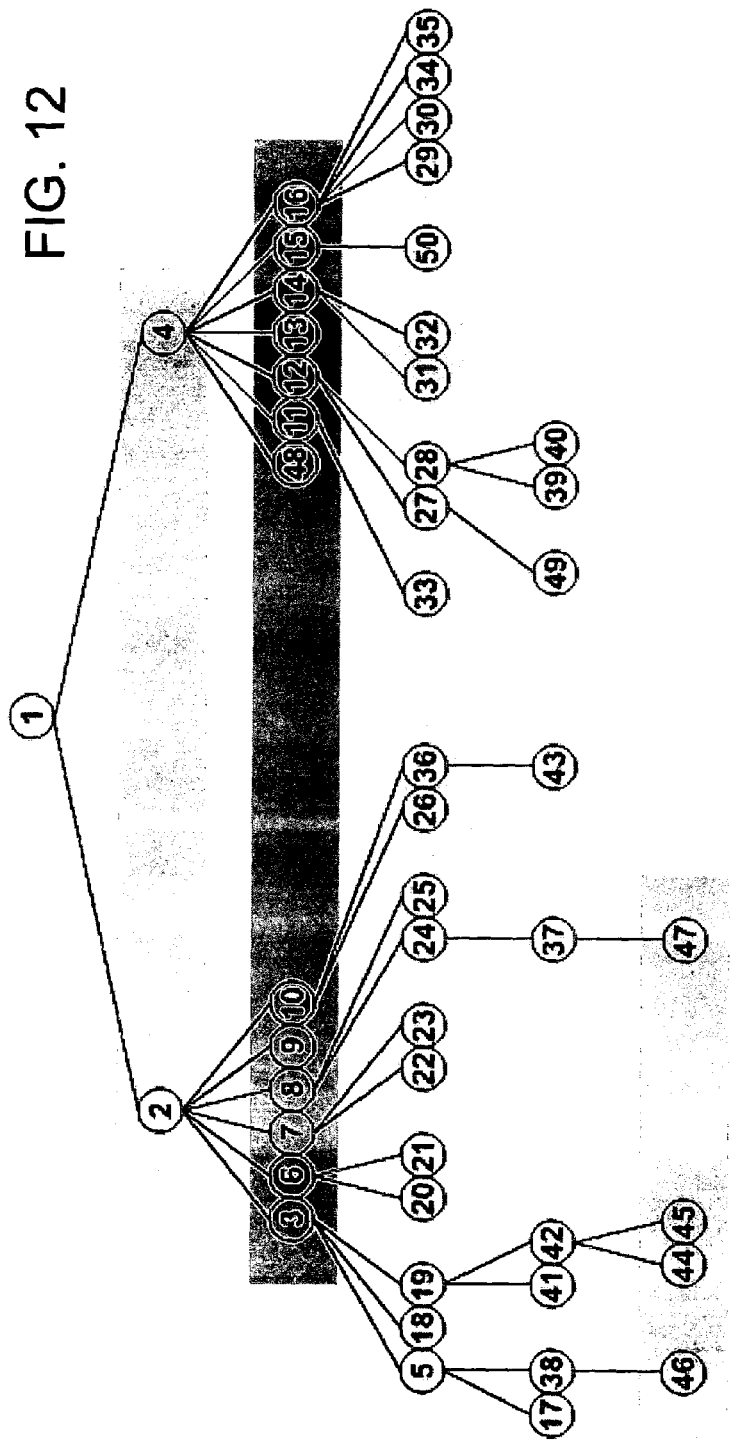
FIG. 11 is a table setting forth the original knowledge base flight test data acquired during the helicopter-associated testing of the present invention.
FIG. 12 is a schematic illustrating a baseline tree structure as embodied in relation to the helicopter-associated testing of the present invention.

The original knowledge base 4000 for the present invention's prototypical gross weight adaptive sensor 100 was obtained from three flight tests of the H-60 aircraft. The first flight test was a flight loads survey on an SH-60B conducted by Sikorsky Aircraft. The second flight test involved an SH-60B aircraft and was conducted at the Naval Air Warfare Center in Patuxent River, Md. as part of the Air Vehicle Diagnostic System (AVDS) Program. For information regarding the U.S. Navy's AVDS Program, see David J. Haas and Carl G. Schaefer, Jr., "Air Vehicle Diagnostic System Technology Demonstration Program," Proceedings of the 55th International Annual Forum of the American Helicopter Society (AHS), pages 2357-2372, Montreal, Quebec, Canada, May 25-27, 1999. The third flight test involved an HH-60J and was conducted at the Naval Air Warfare Center in Patuxent River, Md. Each of these data sources and their respective contributions are shown in FIG. 11. The gross weight for these tests ranges from 15,830 lbs to 25,130 lbs.

With reference to FIG. 12, in order to implement the present invention's recognition process precedent to inventive adaptation, the original knowledge base 4000 was arranged into a tree structure consisting of forty-seven nodes defined by the neural tree algorithm. The true structure separated at its first hierarchical level into in-ground effects (lefthand branch as shown in FIG. 12) and out-of-ground effects (righthand branch as shown in FIG. 12), and subsequently subdivided based on the remaining parameters. From this baseline, additional information obtained from the developmental flight test of the HUMS system is used to execute the inventive adaptation. The data considered for this process corresponds to three distinct SH-60B aircraft, based on both the east and west coasts, and spans approximately a three-year period. During this time, many different tests were performed, and only a fraction of the flights could be used for inventive adaptation. Forty-two flights with dedicated time spent in steady hover were utilized.

Figure 13:
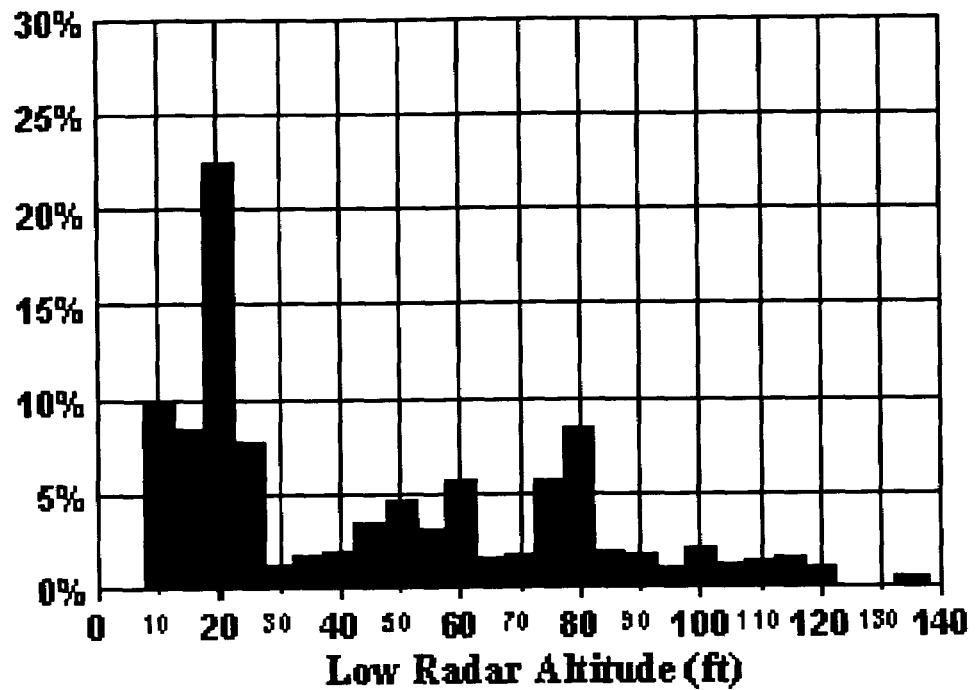
FIG. 13 is a graph illustrating the radar altitude profile for the adaptation dataset composed in relation to the helicopter-associated testing of the present invention.
Figure 14:
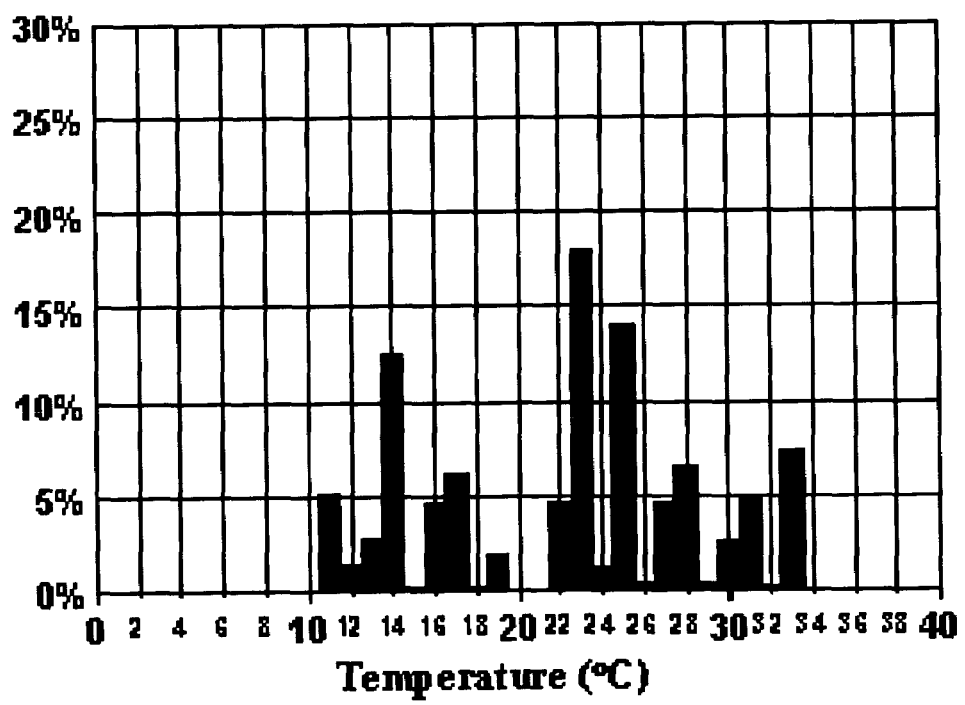
FIG. 14 is a graph illustrating the temperature profile for the adaptation dataset composed in relation to the helicopter-associated testing of the present invention.
Figure 15:
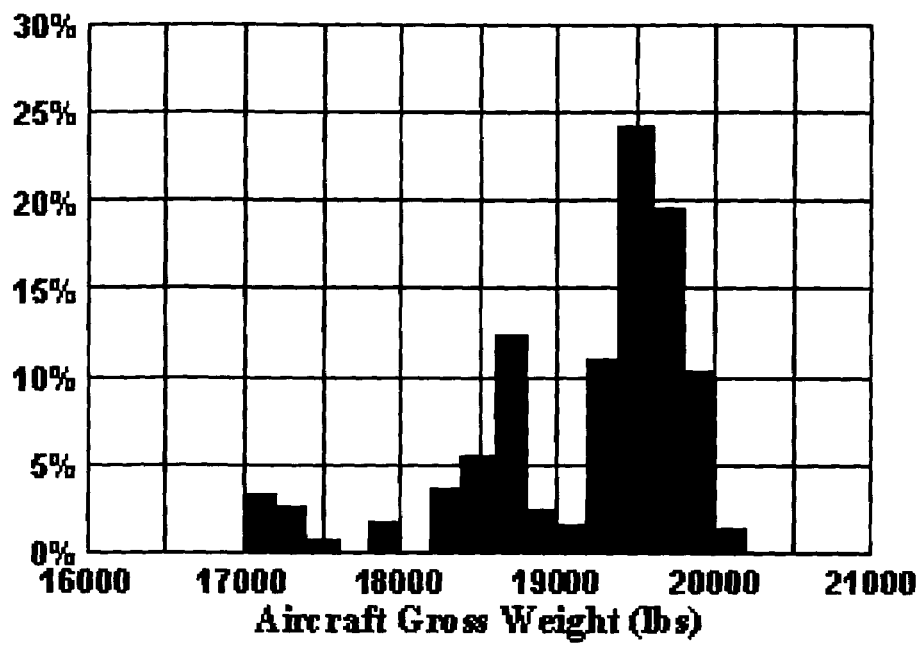
FIG. 15 is a graph illustrating the aircraft gross weight profile for the adaptation dataset composed in relation to the helicopter-associated testing of the present invention.

Data composition profiles for radar altitude, temperature and gross weight are given in FIG. 13, FIG. 14 and FIG. 15. As can be seen from FIG. 13 through FIG. 15, the temperature and altitude distributions cover a comprehensive range of operations through the most common weight range flown by the SH-60, thereby demonstrating the diversity of the data. It should be noted that the temperature parameter is known to play an important role in engine performance as well as aircraft aerodynamic response. However, the temperature parameter is not explicitly used by the inventive model, since it is assumed that the contribution from the temperature is reflected in the control parameters already used by the model. This assumption is later verified by the lack of inconsistencies encountered during inventive adaptation.

Because adaptation in accordance with the present invention is a time-dependent process, improvements to the knowledge base 4000, and hence sensor 100 capability, are presented at several discrete times in order to appreciate the effects and benefits of the inventive process. The present invention's gross weight adaptive sensor as currently implemented for testing purposes on the aircraft is similarly updated at discrete times; that is, the present invention's gross weight adaptive sensor is not allowed to adapt onboard the aircraft due to flight clearance issues. Nevertheless, the inventive gross weight adaptive sensor is concurrently implemented on a ground station and in a flight simulation environment where it retains all its functions; it is at these locations that the novel states are stored, evaluated and incorporated into the sensor's knowledge base. Novel states are also recognized onboard the aircraft, but are not stored. Inventive sensor adaptations are then implemented during software upgrades. Since its inception, two upgrades have been conducted. For convenience, the adaptation results illustrated in FIG. 16 and FIG. 17 have been chosen to coincide with these upgrades.

Figure 16:
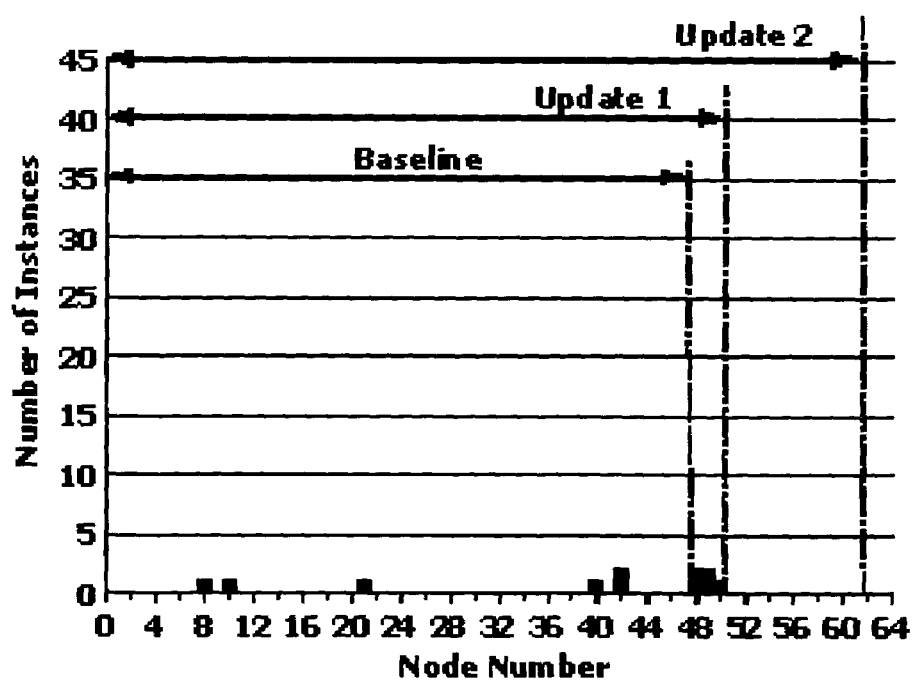
FIG. 16 is a graph illustrating the knowledge base activity and improvements after the first update as obtained in relation to the helicopter-associated testing of the present invention.
Figure 17:
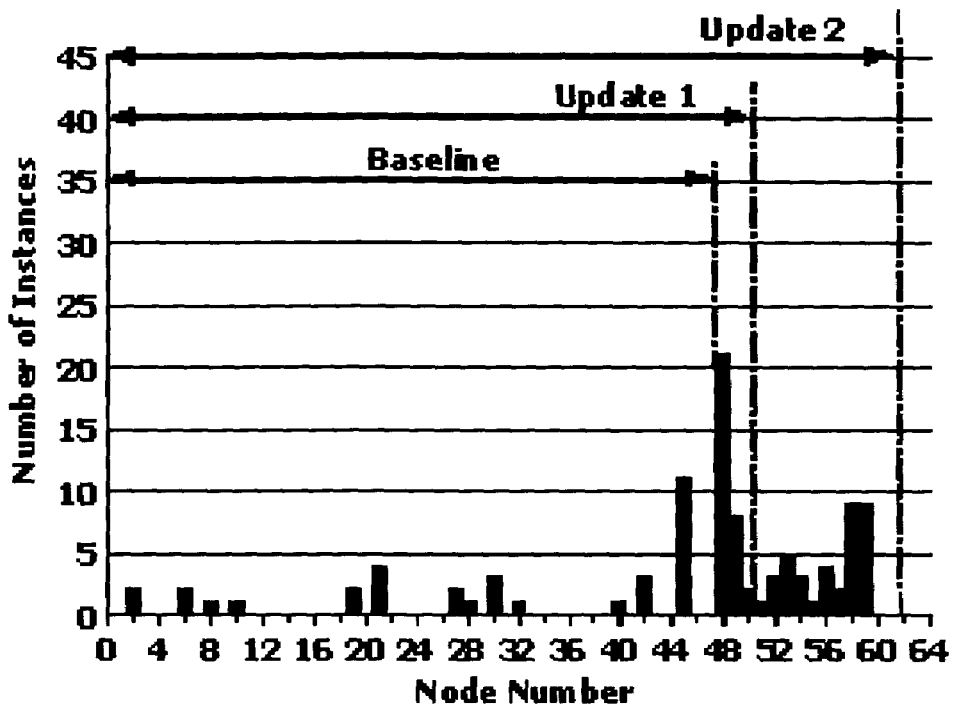
FIG. 17 is a graph illustrating the knowledge base activity and improvements after the second update as obtained in relation to the helicopter-associated testing of the present invention.

FIG. 16 and FIG. 17 show the knowledge base improvements represented by the node numbers corresponding to the tree structure developed for this task. All node numbers greater than 47 (47 nodes being indicated in the baseline tree structure of FIG. 12) represent improvements in the knowledge base. Each count in the figures is referred to as an "instance" and is defined as an uninterrupted valid sequence of associations greater than one second, but no longer than one minute. This concept is used to determine the value of each individual region or node based on its usage, without biasing this number based on the sampling frequency or duration of the event. Associations lasting about one second are considered to be just as accurate as those lasting a full minute. Beyond one minute, gross weight changes are no longer averaged as part of the same instance.

Figure 18:
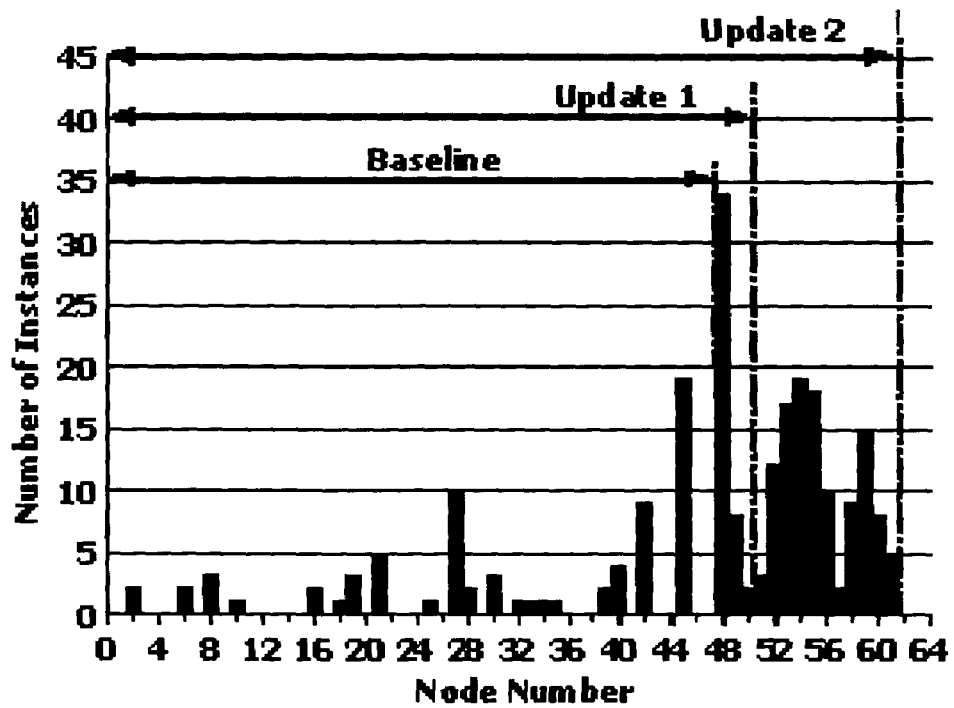
FIG. 18 is a graph illustrating the knowledge base activity for all available flights as obtained in relation to the helicopter-associated testing of the present invention.
Figures 19, 20:
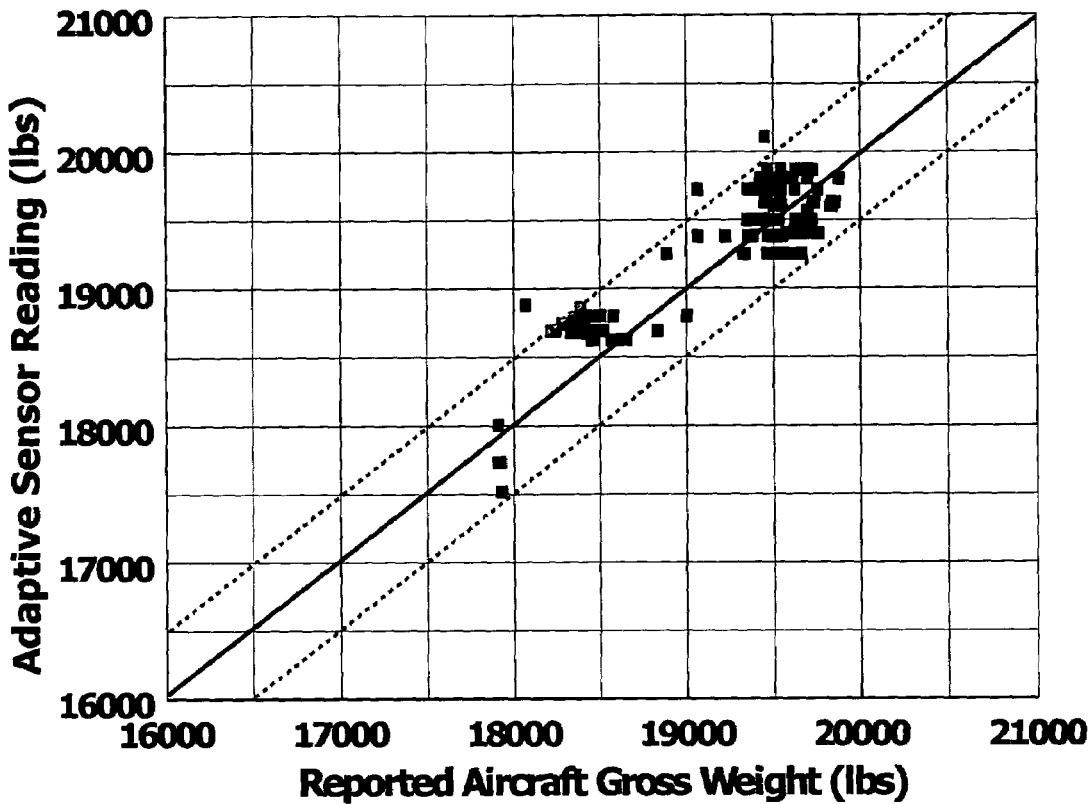
FIG. 19 is a graph illustrating the performance of the present invention's adaptive sensor (dashed lines indicate ±500 lbs error boundaries) in relation to the helicopter-associated testing of the present invention.
FIG. 20 is a table setting forth the data contents and knowledge base improvements acquired during the helicopter-associated testing of the present invention.

All flights taking place after the second update are used to verify the sensor results, assuming that the sensor has been transitioned to a fleet aircraft. This dataset is referred to as the validation set. Because the fleet aircraft does not inventively adapt, the value and performance of the inventive adaptive sensor as a final application can be assessed. FIG. 18 shows the regions of activity for all flights, and FIG. 19 shows the accuracy of the relationship obtained from inventive sensor adaptation for the validation flights only. Notice that previous flights must follow adaptation constraints and be within ±500 lbs; any previous flights that are otherwise will be labeled as inconsistencies. The number of flights considered for each dataset as well as the knowledge base improvements are quantified in FIG. 20.

FIG. 16, FIG. 17 and FIG. 18 show the cumulative activity for each node as new flights become available. It is seen in FIG. 16 through FIG. 18 that activity increases significantly with each data set. This increase in activity comes not only as a result of more flights being processed, but also from the fact that there are more known regions that can be utilized as references to provide a gross weight reading. The number of instances logged for each set are: 11 instances for the first update; 101 instances for the second update; and, 132 instances for the validation. The total is 244 distinct instances. Perhaps even more important is the fact that most of the activity takes place at the new nodes. This readily indicates that for this application the inventive adaptation process is of high value, as without it, most assessments of the gross weight would not have been considered.

It should be pointed out that, although the set consisting of the last 24 flights is labeled as the validation set, in actuality all instances shown in FIG. 16 through FIG. 18 constitute validation events. This is because the nodes have already been corroborated by the time they become part of the knowledge base. As a result, the instances shown in FIG. 16 through FIG. 18 effectively provide further corroboration or validation of the knowledge base. The only real difference between these sets is that inconsistencies are readily identified during updating, whereas this is not done for the validation set. For this study, only one inconsistency was found during updating, and its effect was limited to delaying the assimilation of a single node.

Performance results shown in FIG. 19 are given using a 45° plot where the reported gross weight at the time the measurement is taken is compared to the gross weight reading from the inventive adaptive sensor. Ideally, results should lay along the 45° line (solid line). However, if this is not the case, scatter becomes evident. This scatter represents the error between what is deemed the correct gross weight value (e.g., best available record of pilot-logged gross weight) and the adaptive sensor reading. In order to better assess the accuracy of the predictions, +500 lbs error bands (dashed lines) are superimposed in the figure. The relevance of selecting 500 lbs as the limit is tied to the desired accuracy of the sensor. As can be seen in FIG. 19, there are only three instances out of one hundred thirty-two instances where these limits are exceeded. The errors for these three instances are 653 lbs, 658 lbs and 812 lbs. The first two instances are valid errors, but are only around 150 lbs above the desired limit. The third instance represents a more significant error and also represents an inconsistency, because the region where its measurement vector is classified is associated with a significantly different weight. Further analysis could not verify the accuracy of the reported gross weight for that particular flight, resulting in the flight being labeled as unreliable.

In order to obtain a quantifiable measure of inventive sensor accuracy, the root mean square (RMS) error is calculated. This value indicates the most likely error expected for any given reading of the inventive adaptive sensor. After removing the flight labeled as unreliable from the validation dataset, the RMS was calculated to be 260 lbs for the validation set and 236 lbs for the cumulative of all three sets. This same calculation is also performed on a per-flight basis in order to determine the expected error for individual flights. This is of particular importance because gross weight is utilized for various analyses after flight completion. At that time, it is the average RMS error for the various instances in the flight that affects those calculations. The results showed the maximum and mean RMS errors for a given flight to be 382 lbs and 199 lbs respectively when considering all available flights. These constitute excellent results for this application of the present invention's adaptive sensor methodology.

The value of the inventive methodology was evident in the activity found in the regions resulting from inventive adaptation. These regions account for 68% of all instances identified, implying that, without the contribution from inventive adaptation, more than half of the information would have been discarded. The accuracy of the inventive sensor was demonstrated by achieving an RMS error of 260 lbs for the validation set and 236 lbs for all flights. This is a significant achievement for an aircraft whose operational gross weight ranges between 16,000 and 22,000 lbs. Of particular importance, with the exception of two instances amounting to 1.5% of the validation data set, all of the inventive adaptive sensor readings remained within the design error values of ±500 lbs.

Furthermore, when these readings are utilized for non-real-time studies, they can be averaged within a flight and realize further gains in accuracy, resulting in a mean error value of 199 lbs for any given flight. A single inconsistency found during validation illustrated the ability of the inventive algorithm to identify problems with the data. In this example, the inventive adaptive sensor consistently returned a gross weight value higher than the reported value in regions of high confidence for the flight where the inconsistency was found, indicating that the reported gross weight is very likely to contain errors.

As discussed hereinabove, the present invention's robust strategy for continuous learning outside a controlled environment has been successfully integrated with sensors from an aircraft monitoring system to produce an adaptive sensor in accordance with the present invention. The present invention's novel smart sensor has the ability to improve its capabilities over time, and is attributed with a natural resiliency against assimilating incorrect information. The inventive adaptive sensor maintains a virtual tree structure that it uses to recognize incoming measurements and identify inconsistencies in the data stream, which it sets apart for further analysis. In this way, the present invention's adaptive sensor can, in effect, perform its own quality control. In view of the demonstrated benefits afforded by the present invention's aircraft gross weight adaptive sensor embodiment, it is expected that inventive adaptive sensors will play an important role in future aircraft health and usage monitoring systems.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. A method for effecting smart sensing, the method comprising:
   making a series of sensor measurements constituting a data stream in real time; and
   continually determining, in real time, useful collections of values relating to said sensor measurements;
   said continually determining being performed so as to recognize and assimilate new information, corroborate previous information, and identify inconsistencies in said data stream;
   said continually determining including classifying each current said sensor measurement as being either recognized or unrecognized in the context of a permanent knowledge base;
   wherein if the current said sensor measurement is classified as being recognized, then said continually determining further includes determining whether an outcome associated with the recognized current said sensor measurement is consistent with an outcome of at least one other said sensor measurement that exists in said permanent knowledge base and that constitutes a basis for said recognition;
   wherein if said outcome associated with the recognized current said sensor measurement is consistent with an outcome of at least one other said sensor measurement that exists in said permanent knowledge base and that constitutes a basis for said recognition, then said continually determining further includes assimilating, into said permanent knowledge base, information including the recognized current said sensor measurement and at least one characteristic of the recognized current said sensor measurement;
   wherein if the current said sensor measurement is classified as being unrecognized, then said continually determining further includes categorizing the unrecognized current said sensor measurement in a hierarchal structure in a temporary knowledge base, associating the unrecognized current said sensor measurement with an outcome, and determining whether the unrecognized current said sensor measurement is subsequently corroborated by at least one future said sensor measurement;
   wherein if the unrecognized current said sensor measurement is determined to be corroborated by at least one future said sensor measurement, then said continually determining further includes assimilating, into said permanent knowledge base, information including the corroborated current said sensor measurement and at least one characteristic of the corroborated current said sensor measurement; and
   wherein if the current said sensor measurement is classified as being unrecognized, then: the unrecognized current said sensor measurement is made during a current event run; said at least one future said sensor measurement is made during at least one future said event run.

2. The method for effecting smart sensing as recited in claim 1, wherein if the current said sensor measurement is classified as being unrecognized, said continually determining further includes placing the unrecognized current said sensor measurement in provisional storage at least until the conclusion of the current said event run, said categorizing being performed after the conclusion of the current said event run.

3. The method for effecting smart sensing as recited in claim 1, wherein said corroboration includes:
   recognition of the unrecognized current said sensor measurement in view of at least one future said sensor measurement; and consistency of said outcome associated with the unrecognized current said sensor measurement with an outcome of at least one future said sensor measurement.

4. The method for effecting smart sensing as recited in claim 3, wherein if the current said sensor measurement is classified as being unrecognized, said continually determining further includes placing the unrecognized current said sensor measurement in provisional storage at least until the conclusion of the current said event run, said categorizing being performed after the conclusion of the current said event run.

5. A smart sensing device comprising at least one sensing element and a machine having a memory, said machine containing a data representation pertaining to observations performed via said at least one sensing element, said observations constituting a data stream in real time, said data representation continually adapting, in real time, to recognize and assimilate new information, to corroborate previous information, and to identify inconsistencies in said data stream, said data representation thereby continually determining, in real time, useful collections of values relating to said at least one sensing element, said data representation being generated, in real time, for availability for containment by said machine, by the method comprising:

classifying a current said observation as being either recognized or unrecognized in the context of a permanent knowledge base;

if the current said observation is classified as being recognized, determining whether an outcome associated with the recognized current said observation is consistent with an outcome of at least one other said observation that exists in said permanent knowledge base and that constitutes a basis for said recognition;

if said outcome associated with the recognized current said observation is consistent with an outcome of at least one other said observation that exists in said permanent knowledge base and that constitutes a basis for said recognition, assimilating, into said permanent knowledge base, information that includes the recognized current said observation and at least one characteristic of the recognized current said observation;

if the current said observation is classified as being unrecognized, categorizing the unrecognized current said observation in a hierarchal structure in a temporary knowledge base, associating the unrecognized current said observation with an outcome, and determining whether the unrecognized current said observation is subsequently corroborated by at least one future said observation;

if the unrecognized current said observation is determined to be corroborated, assimilating, into said permanent knowledge base, information that includes the corroborated current said observation and at least one characteristic of the corroborated current said observation;

wherein, if the current said observation is classified as being unrecognized, then: the unrecognized current said observation is made during a current event run; said at least one future said observation is made during at least one future said event run.

6. The smart sensing device of claim 5, wherein if the current said observation is classified as being unrecognized, then the unrecognized current said observation is placed in provisional storage at least until the conclusion of the current said event run, said categorizing being performed after the conclusion of the current said event run.

7. The smart sensing device of claim 5, wherein said corroboration includes:

recognition of the unrecognized current said observation in view of at least one future said observation; and consistency of said outcome associated with the unrecognized current said observation with an outcome of at least one fixture said observation.

8. The smart sensing device of claim 7, wherein if the current said observation is classified as being unrecognized, then the unrecognized current said observation is placed in provisional storage at least until the conclusion of the current said event run, said categorizing being performed after the conclusion of the current said event run.

9. A computer program product comprising a computer readable storage medium having computer readable program code portions recorded thereon for enabling a computer, in an ongoing manner, to gain knowledge originating with measurements taken by a sensor, the computer readable program code portions comprising:

a first executable portion, for enabling said computer to classify a current measurement as being either recognized or unrecognized in the context of a permanent knowledge base;

a second executable portion, for enabling said computer, if the current said measurement is classified as being recognized, to determine whether an outcome associated with the recognized current said measurement is consistent with an outcome of at least one other measurement that exists in said permanent knowledge base and that constitutes a basis for said recognition;

a third executable portion, for enabling said computer, if said outcome associated with the recognized current said measurement is consistent with an outcome of at least one other said measurement that exists in said permanent knowledge base and that constitutes a basis for said recognition, to assimilate information in said permanent knowledge base, said assimilated information including the recognized current said measurement and at least one characteristic of the recognized current said measurement;

a fourth executable portion, for enabling said computer, if the current said measurement is classified as being unrecognized, to categorize the unrecognized current said measurement in a hierarchal structure in a temporary knowledge base, to associate the unrecognized current said measurement with an outcome, and to determine whether the unrecognized current said measurement is subsequently corroborated by at least one fixture said measurement; and a fifth executable portion, for enabling said computer, if the unrecognized current said measurement is determined to be corroborated, to assimilate, into said permanent knowledge base, information including the corroborated current said measurement and at least one characteristic of the corroborated current said measurement;

wherein, if the current said measurement is classified as being unrecognized, then: the unrecognized current said measurement is made during a current event run; said at least one future said measurement is made during at least one fixture said event run; and wherein said measurements constitute a data stream in real time, said computer continually adapting, in real time, to recognize and assimilate new information, to corroborate previous information, and to identify inconsistencies in said data stream, said computer thereby continually determining, in real time, useful collections of values relating to said sensor.

10. The computer program product according to claim 9, wherein said computer readable program code portions further include a sixth executable portion, for enabling said computer, if said current measurement is classified as being unrecognized, to place the unrecognized current said measurement in provisional storage at least until the conclusion of the current said event run, said categorizing being performed after the conclusion of the current said event run.

11. The computer program product according to claim 9, said corroboration including:
   recognition of the unrecognized current said measurement in view of at least one future said measurement; and
   consistency of said outcome associated with the unrecognized current said measurement with an outcome of at least one fixture said measurement.

12. The computer program product according to claim 11, wherein said computer readable program code portions further include a sixth executable portion, for enabling said computer, if the current said measurement is classified as being unrecognized, to place the unrecognized current said measurement in provisional storage at least until the conclusion of the current said event run, said categorizing being performed after the conclusion of the current said event run.

13. A method for effecting smart sensing, the method comprising:
   making a series of sensor measurements constituting a data steam in real time; and
   continually determining, in real time, useful collections of values relating to said sensor measurements, said continually determining being performed so as to recognize and assimilate new information, corroborate previous information, and identify inconsistencies in said data stream;
   said continually determining including classifying each current said sensor measurement as being either recognized or unrecognized in the context of a permanent knowledge base:
   wherein if the current said sensor measurement is classified as being recognized, then said continually determining further includes determining whether an outcome associated with the recognized current said sensor measurement is consistent with an outcome of at least one other said sensor measurement that exists in said permanent knowledge base and that constitutes a basis for said recognition;
   wherein if said outcome associated with the recognized current said sensor measurement is consistent with an outcome of at least one other said sensor measurement that exists in said permanent knowledge base and that constitutes a basis for said recognition, then said continually determining further includes assimilating, into said permanent knowledge base, information including the recognized current said sensor measurement and at least one characteristic of the recognized current said sensor measurement;
   wherein if the current said sensor measurement is classified as being unrecognized, then said continually determining further includes categorizing the unrecognized current said sensor measurement in a hierarchal structure in a temporary knowledge base, associating the unrecognized current said sensor measurement with an outcome, and determining whether the unrecognized current said sensor measurement is subsequently corroborated by at least one future said sensor measurement;
   wherein if the unrecognized current said sensor measurement is determined to be corroborated by at least one future said sensor measurement, then said continually determining further includes assimilating, into said permanent knowledge base, information including the corroborated current said sensor measurement and at least one characteristic of the corroborated current said sensor measurement; and
   wherein if said outcome associated with the recognized current said sensor measurement is not consistent with any outcome of at least one other said sensor measurement that exists in said permanent knowledge base and that constitutes a basis for said recognition, then said continually determining further includes flagging, but not assimilating into said permanent knowledge base, the recognized current said sensor measurement.

14. A computer program product comprising a computer readable storage medium having computer readable program code portions recorded thereon for enabling a computer, in an ongoing manner, to gain knowledge originating with measurements taken by a sensor, computer readable program code portions comprising:
   a first executable portion, for enabling said computer to classify a current measurement as being either recognized or unrecognized in the context of a permanent knowledge base;
   a second executable portion, for enabling said computer, if the current said measurement is classified as being recognized, to determine whether an outcome associated with the recognized current said measurement is consistent with an outcome of at least one other said measurement that exists in said permanent knowledge base and that constitutes a basis for said recognition;
   a third executable portion, for enabling said computer, if said outcome associated with the recognized current said measurement is consistent with an outcome of at least one other said measurement that exists in said permanent knowledge base and that constitutes a basis for said recognition, to assimilate information in said permanent knowledge base, said assimilated information including the recognized current said measurement and at least one characteristic of the recognized current said measurement;
   a fourth executable portion, for enabling said computer, if the current said measurement is classified as being unrecognized, to categorize the unrecognized current said measurement in a hierarchal structure in a temporary knowledge base, to associate the unrecognized current ad measurement with an outcome, and to determine whether the unrecognized current said measurement is subsequently corroborated by at least one future said measurement;
   a fifth executable portion, for enabling said computer, if the unrecognized current said measurement is determined to be corroborated, to assimilate, into said permanent knowledge base, information including the corroborated current said measurement and at least one characteristic of the corroborated current said measurement; and
   a sixth executable portion, for enabling said computer, if said outcome associated with the recognized current said measurement is not consistent with any outcome of at least one other said measurement that exists in said permanent knowledge base and that constitutes a basis for said recognition, to flag, but not assimilate into said permanent knowledge base, the recognized current said measurement;
   wherein said measurements constitute a data stream in real time, said computer continually adapting in real time, to recognize and assimilate new information, to corroborate previous information, and to identify inconsistencies in said data stream, said computer thereby continually determining, in real time, useful collections of values relating to said sensor.

* * * * *